(12) United States Patent
Liu et al.

(10) Patent No.: US 8,818,920 B2
(45) Date of Patent: Aug. 26, 2014

(54) INCREMENTAL EFFECT MODELING BY AREA INDEX MAXIMIZATION

(75) Inventors: Xiaohu Liu, West Chester, PA (US); Jing Li, Newark, DE (US)

(73) Assignee: Bank of America Corporation, Charlotte, NC (US)

( * ) Notice: Subject to any disclaimer, the term of this patent is extended or adjusted under 35 U.S.C. 154(b) by 390 days.

(21) Appl. No.: 13/416,149

(22) Filed: Mar. 9, 2012

(65) Prior Publication Data

US 2013/0238539 A1    Sep. 12, 2013

(51) Int. Cl.
*G06F 15/18*    (2006.01)

(52) U.S. Cl.
USPC ........................................... 706/12; 705/7.31

(58) Field of Classification Search
USPC ............................................................. 706/46
See application file for complete search history.

(56) References Cited

U.S. PATENT DOCUMENTS

| | | | | |
|---|---|---|---|---|
| 7,873,535 | B2 * | 1/2011 | Umblijs et al. | 705/7.12 |
| 8,041,619 | B1 | 10/2011 | Liu et al. | |
| 2002/0010620 | A1 * | 1/2002 | Kowalchuk et al. | 705/10 |
| 2006/0041480 | A1 * | 2/2006 | Briggs | 705/14 |
| 2007/0106550 | A1 * | 5/2007 | Umblijs et al. | 705/10 |
| 2011/0258049 | A1 * | 10/2011 | Ramer et al. | 705/14.66 |
| 2014/0114987 | A1 * | 4/2014 | Hoeng et al. | 707/748 |

OTHER PUBLICATIONS

Radcliffe, Nicholas J., et al., Real-World Uplift Modelling with Significance-Based Uplift Trees, Stochastic Solutions White Paper, Portrait Technical Report TR-2011-1, 2011, pp. 1-33, available online at http://www.stochasticsolutions.com/pdf/sig-based-up-trees.pdf.
GLM Procedure: SAS/STAT 9.2 User's Guide Second Edition, Chapter 39, pp. 2431-2619, SAS Institute Inc. 2009. Cary, NC: SAS Institute, Inc.
Rank Procedure: Base SAS 9.2 Procedures Guide, Chapter 49, pp. 943-961, SAS Institute Inc. 2009, Cary, NC: SAS Institute, Inc.
Weisberg, Sanford, Linear Regression, Applied Linear Regression, 3rd Edition, 2005, vol. 528, Wiley (abstract).
Hastie, Trevor, et al., The Elements of Statistical Learning: Data Mining, Inference, and Prediction, Second Edition, Feb. 9, 2009, Springer (Introduction only).

* cited by examiner

*Primary Examiner* — Jeffrey A. Gaffin
*Assistant Examiner* — David H Kim
(74) *Attorney, Agent, or Firm* — Michael A. Springs; Moore & Van Allen, PLLC; Andrew D. Gerschutz

(57) ABSTRACT

How much is the net benefit of treating an individual: cost-effective, very small, or even negative? To address this question, a methodology for developing an incremental effect model based on randomized test data is provided. The concept of an incremental effect area index is introduced for measuring the model's quality. A new variable screening technique is proposed to identify variables that are decision relevant and preferably time invariant. A piecewise linear function is created for each continuous variable to approximate the relationship between the incremental effect and the variable, based on a binning technique. Finally, a score is created as the weighted sum of a set of functions, with each function being the empirical prediction of the incremental effect based on a variable, wherein weights are chosen to maximize the incremental effect area index. The methodology creates an improved incremental effect model, leading to more cost-effective strategies in business practice.

20 Claims, 16 Drawing Sheets

Incremental effect area index = {area of region (ABC)} / {area of rectangle (ABEO)}    (1)

Incremental effect area index = 1 − {area of region (CBEO)} / {area of rectangle (ABEO)}    (2)

Incremental effect area index = {area of region (ABC)} / {area of rectangle (ABEO)}    (1)

Incremental effect area index = 1 − {area of region (CBEO)} / {area of rectangle (ABEO)}    (2)

$$\text{Incremental effect area index} = 1 - \frac{1}{C(1)} \int_0^1 C(p)\, dp \qquad (3)$$

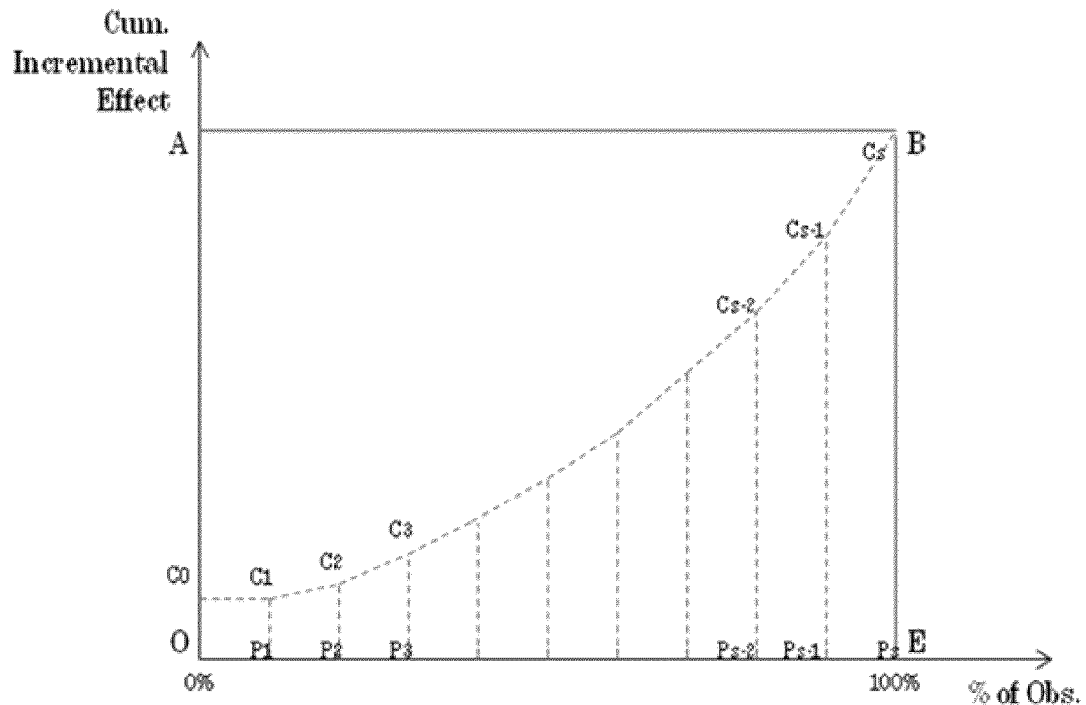

$$\int_0^1 C(p)\,dp \approx \text{area (rectangle } C_0C_1P_1O)) + \text{area (trapezoid } C_1C_2P_2P_1) + \cdots$$

$$+ \text{area (trapezoid } C_{s-2}C_{s-1}P_{s-1}\,P_{s-2}) + \text{area (trapezoid } C_{s-1}C_sP_s\,P_{s-1})$$

$$= p_1 C(p_1) + \frac{1}{2}(p_2 - p_1)(C(p_1) + C(p_2)) + \cdots \qquad (4)$$

$$+ \frac{1}{2}(p_{s-1} - p_{s-2})(C(p_{s-2}) + C(p_{s-1})) + \frac{1}{2}(p_s - p_{s-1})(C(p_{s-1}) + C(p_s))$$

$$= \frac{p_1 + p_2}{2} C(p_1) + \sum_{i=2}^{s-1} \frac{p_{i+1} - p_{i-1}}{2} C(p_i) + \frac{p_s - p_{s-1}}{2} C(p_s)$$

THUS, THE INCREMENTAL EFFECT AREA INDEX ≈

$$1 - \frac{1}{C(1)} \left\{ \frac{p_1 + p_2}{2} C(p_1) + \sum_{i=2}^{s-1} \frac{p_{i+1} - p_{i-1}}{2} C(p_i) + \frac{p_s - p_{s-1}}{2} C(p_s) \right\} \qquad (5)$$

FIG. 1C

PERCENT OBSERVATIONS RANKED FROM LOW
TO HIGH BY SCORE

INCREMENTAL EFFECT MODELING BY AREA INDEX MAXIMIZATION

BACKGROUND

Financial institutions desire to assist current customers by reaching out to them in an effective manner to help them manage their financial accounts. For example, financial institutions may reach out to customers when the customer is eligible for a special type of account, when the customer may benefit from refinancing, or for other reasons. In another example, financial institutions may assist customers in remembering due dates for payments by providing a reminder to the customer of the upcoming bill. These contacts, however, cost the financial institution in the form of the expense of mailing a letter, or the resources required to send an email or call a customer. Still further, some individuals may not be influenced by the contact. For example, some customers may decide to register for the account without being contacted. Thus, some contacts are wasteful use of resources because the contact is not necessary or does not have the desired effect.

Financial institutions also desire to use their resources in the most efficient manner. The financial institution may have limited resources for contacting customers and thus desire to contact those customers most receptive to the contact. Unfortunately, the financial institutions are not efficient in determining which individuals should be contacted and therefore the institutions waste money on contacting individuals unnecessarily.

A traditional approach to determine which individuals should be contacted includes building two separate regression models, one for the test population (or treated population) and one for the control population (or untreated population), and then taking the difference between the two models. This "two model then differencing" approach, however, does not work well in ordering the incremental effect. That is, this approach is insufficient for determining the incremental effect given underlying variation in the population. A major drawback of this traditional approach is that it models the test data and the control data separately. When the test data and the control data are treated separately, the decision variable cannot be included in either the test model or the control model. A variable might be very predictive in either the test model, the control model, or even in both, but there is no guarantee that this variable is decision relevant, because there is no way to test the significance of the interaction between this variable and the decision variable when the test data and the control data are studied separately.

Additional issues that make modeling the incremental effect (or net effect) of a treatment on individuals difficult include that individuals cannot be in both a treatment group and a control group, that the impact of the variable on incremental effect is typically non-linear, that there may be a very low signal to noise ratio (e.g., there may be a weak signal and a strong noise), and that the variables may not be stable over time. The traditional approaches do not adequately address these issues.

A more precise incremental effect model is beneficial because individuals can be targeted with a greater degree of certainty. In the past, individuals were either treated randomly or treated using models that did not reliably predict the incremental effect giving the underlying variation within the populations. All of these issues can add up to wasted time, effort, and expense for financial institutions as they consider which individuals to assist through providing a treatment. Furthermore, the inefficient application of the treatment increases costs to the financial institution.

BRIEF SUMMARY

Embodiments of the present invention address the above needs and/or achieve other advantages by providing an apparatus (e.g., a system, computer program product, and/or other device) and a computer-implemented method for modeling the incremental effect of a treatment at the individual or account level. The incremental effect is defined as the difference between the performance of an individual under treatment and the performance of the individual under no treatment. The incremental effect is sometimes called the treatment's incremental effect (or net effect) on the response of an individual.

An individual is either treated or not treated and therefore observations can be made of an individual's performance under treatment or no treatment, but not under both. Therefore, the incremental effect cannot be observed at the individual level. This leads to the greatest challenge for incremental effect modeling. Since traditional regression techniques require a data in which the value of a dependent variable is known for each observation or each individual, these techniques cannot be applied directly for incremental effect modeling. In addition, none of the criteria for measuring the quality of a traditional regression model, such as R-square, K-S, and ROC, can be directly applied for measuring the quality of an incremental effect model score. As a criterion for measuring the quality of such a score, the incremental effect area index is introduced into the computer implemented method. The incremental effect area index plays a critical role in our method for model score searching.

To develop a good incremental effect model, a large randomized test data is desired, wherein individuals are randomly assigned for treatment and no treatment. In some observational studies, a treatment group might be a selected subset of the population universe, which may differ from the untreated individuals substantially. In this case, a pseudo control group might be created from the untreated individuals to match the individuals in the treatment group, based on propensity score matching or nearest neighbor matching. The resulting artificially created test and control data may be adequate for incremental effect modeling as well. But the quality of the data may vary case by case. We strongly recommend collecting the data from a randomized test. Although not required, ideally, the randomized test should have run for multiple months (at different times, or in different campaigns), so that based on the data, we have a better chance to develop a model that performs well for each of the multiple months and thus will more likely perform well in the future. Furthermore, before developing an incremental effect model, we recommend conducting a T-test or an asymptotic Z-test on the data, to check if the test group and the control group have statistically significant different mean values of the dependent variable. If the answer is yes, we know that the overall treatment effect is statistically significantly different from zero. We can then proceed to develop the incremental effect model at the individual level.

In some literatures, incremental effect modeling is also called uplift modeling, net response modeling, or incremental modeling. It is a technique to predict the incremental effect (or net impact) of a treatment on the performance of an individual, such as an account or a customer. The performance, called the dependent variable, can be any metric of our interest. For instance, the performance may be a paid or not paid flag, the payment amount in a billing cycle, the loss amount, the revenue amount, the profit amount, and etc. The treatment can be any binary business decision, such as sending mail versus not sending mail, calling the individual versus not calling the individual, activating an account for the individual versus not activating an account for the individual, repricing an option for the individual versus not repricing an option for the individual, etc. The treatment flag indicating treatment or no treatment is called decision variable.

The computer-implemented method results in an incremental effect model score, which rank orders the incremental effect of the treatment of the individuals. The score can tell if the incremental effect for an individual is large or small but may not tell exactly how much the incremental effect is. By using the score, individuals or accounts can be ranked relative to one another based on which individuals or accounts will have the greater incremental effect due to a treatment.

In contrast to imprecise models, the incremental effect model determined by the disclosed computer program products, computer-implemented methods, and apparatuses utilizes a new variable screening technique to successfully identify the potential variables that can predict the incremental effect well individually. These variables are termed decision relevant. In some embodiments, the variables are evaluated to determine if they are showing a consistent pattern of incremental effect over different times, termed time invariant. Our methodology focuses on the variables that are decision relevant, and preferably time invariant. In some embodiments, the variables are ranked based on their individual predicting power for estimating the incremental effect of the individuals, wherein the predicting power of a variable is determined by the significance of the interaction between the variable and the decision variable. In some embodiments, a transformation (or a function) of the variable is created to estimate the relationship between the incremental effect and the variable based on the combined treatment and control data. In particular, when a predictor variable is continuous, through binning, a piecewise-linear function is created to approximately describe the relationship between the incremental effect and the variable. In some embodiments, the incremental effect model utilizes a forward stage-wise step for selection of the weights of the variables. The incremental effect model is a weighted sum of the functions (or transformations) of a set of selected variables, wherein the weights are chosen as the result of maximizing the incremental effect area index.

Incremental effect modeling is very useful to estimate the return on investment value at individual level, to help the decision makers develop a strategy that is cost effective in marketing campaigns. The increased efficacy of targeted marketing saves resources for the user of the incremental effect model by not treating individuals that would be unlikely to be affected by the treatment, or would be negatively affected by the treatment.

BRIEF DESCRIPTION OF THE SEVERAL VIEWS OF THE DRAWINGS

Figure 1A:
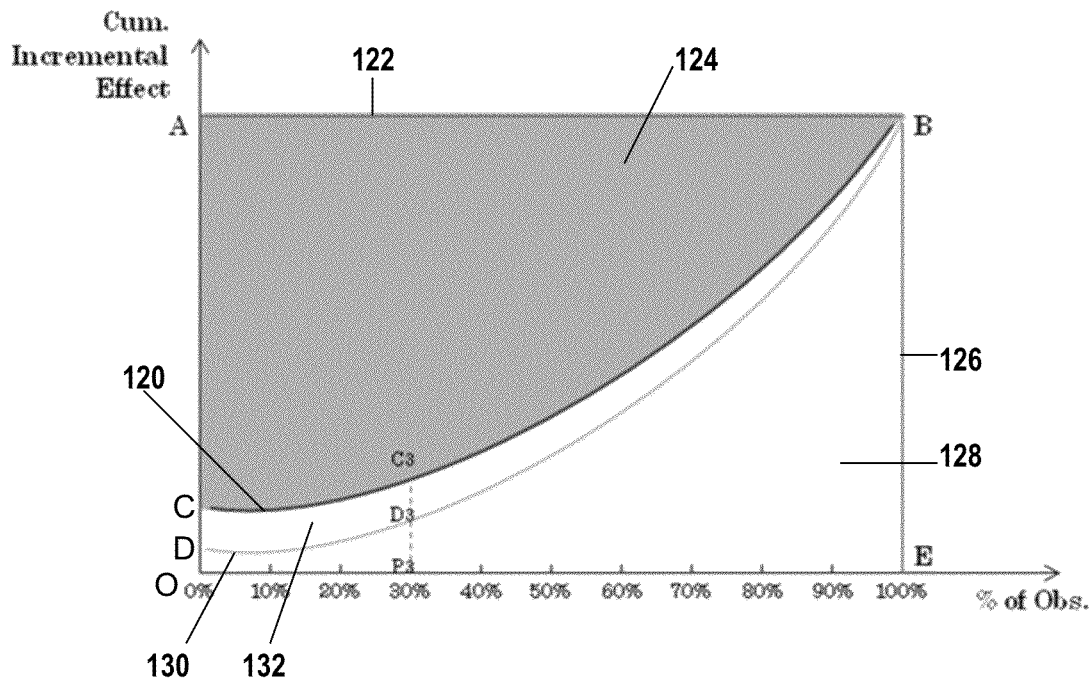
Figure 1B:
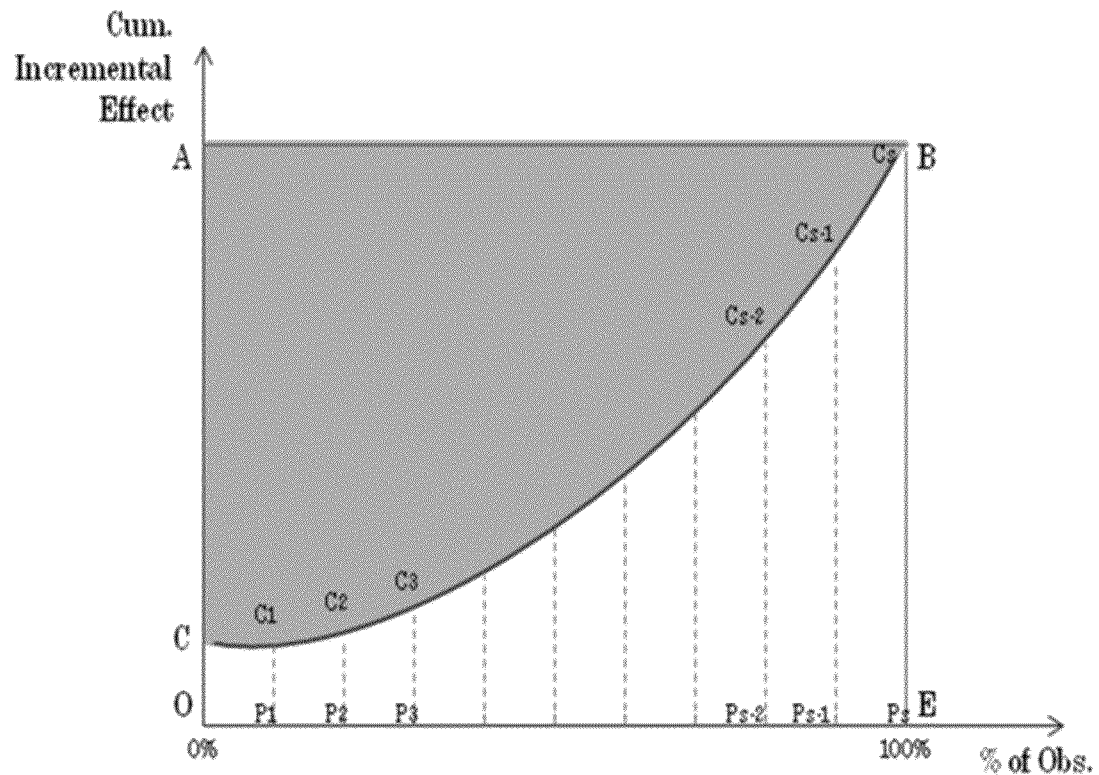
Figure 1D:
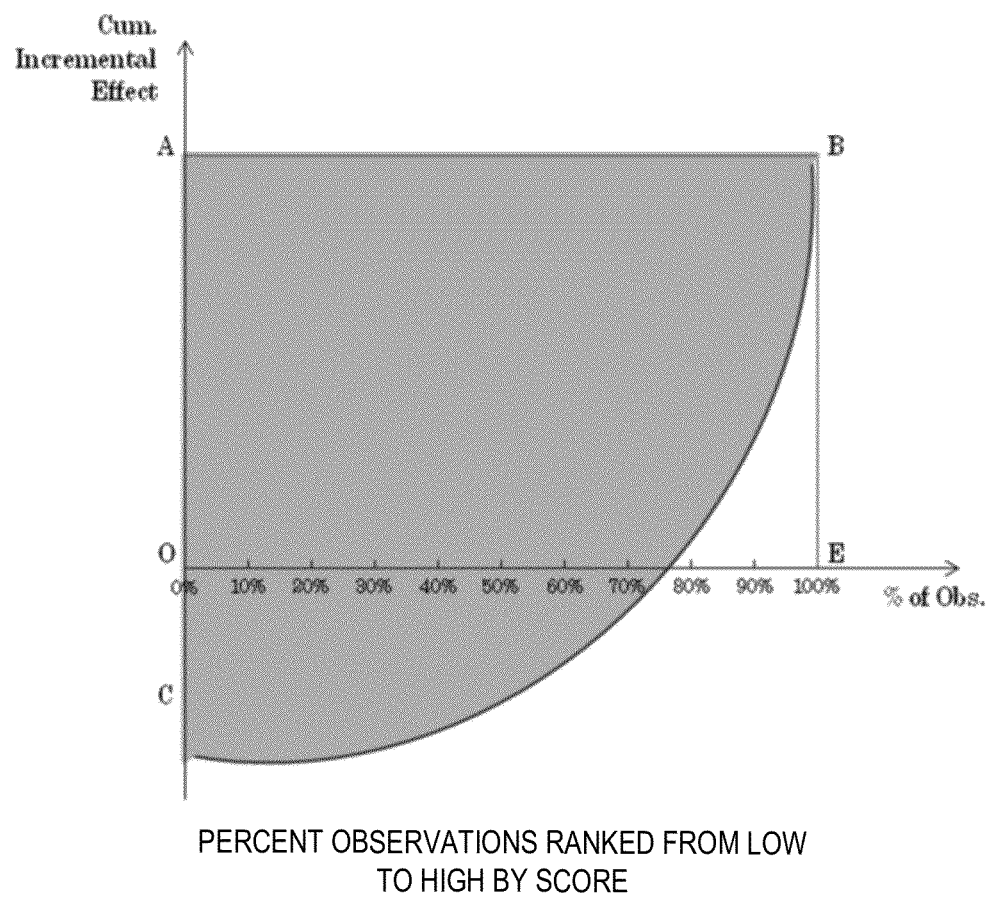
Figure 1E:
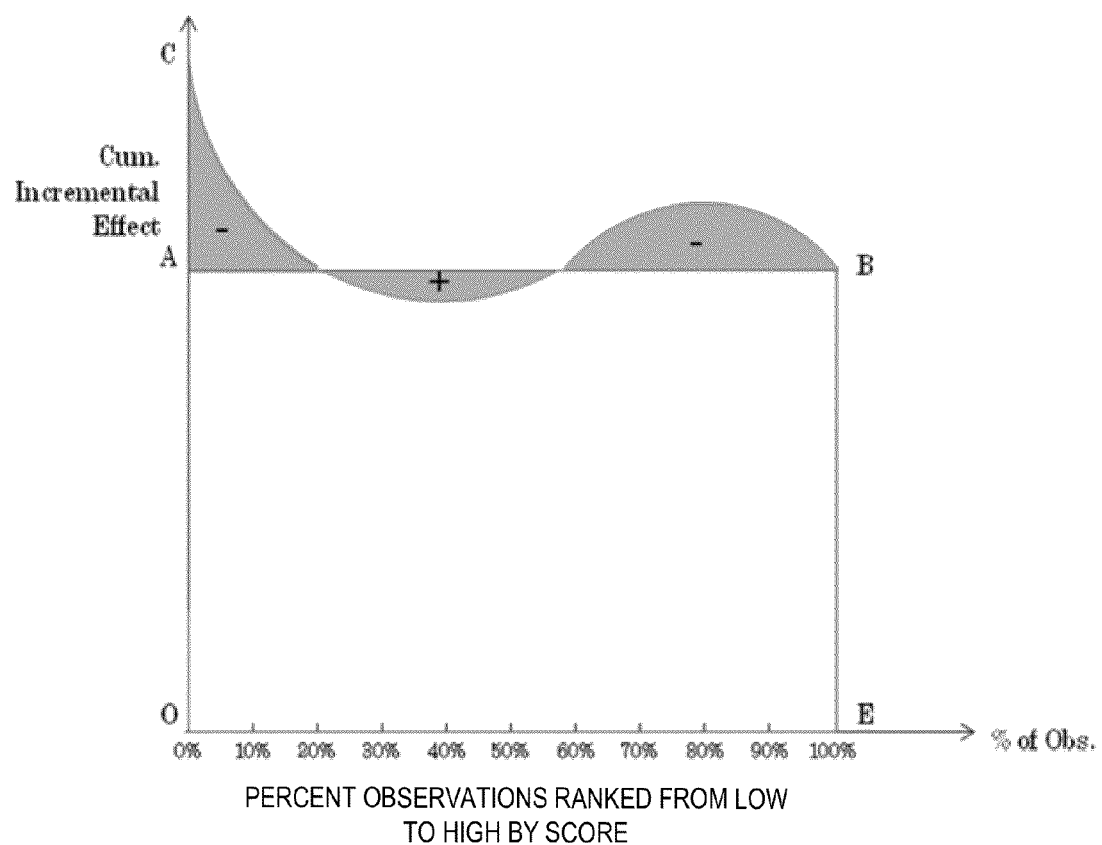
Figure 1:
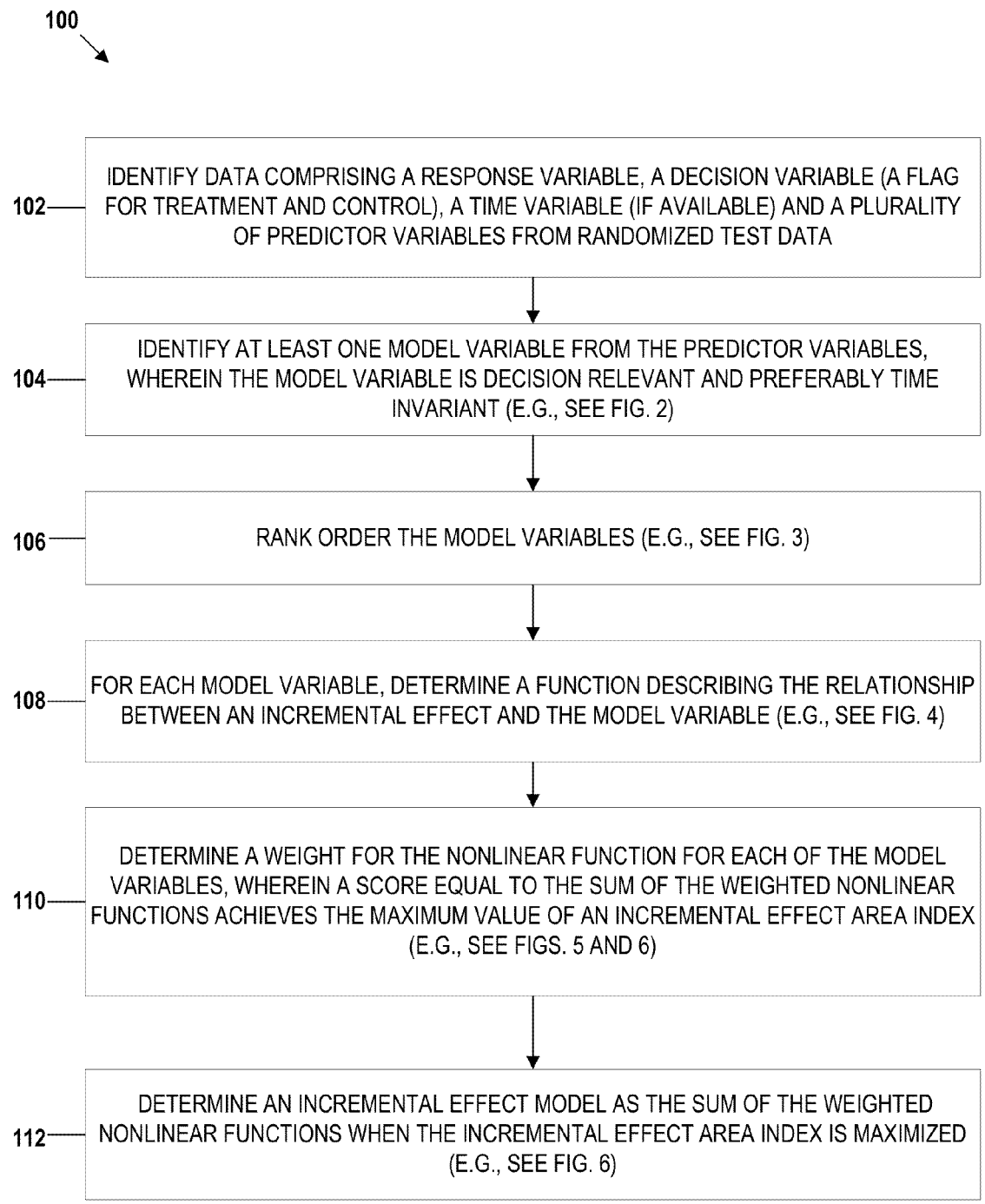
Figure 2:
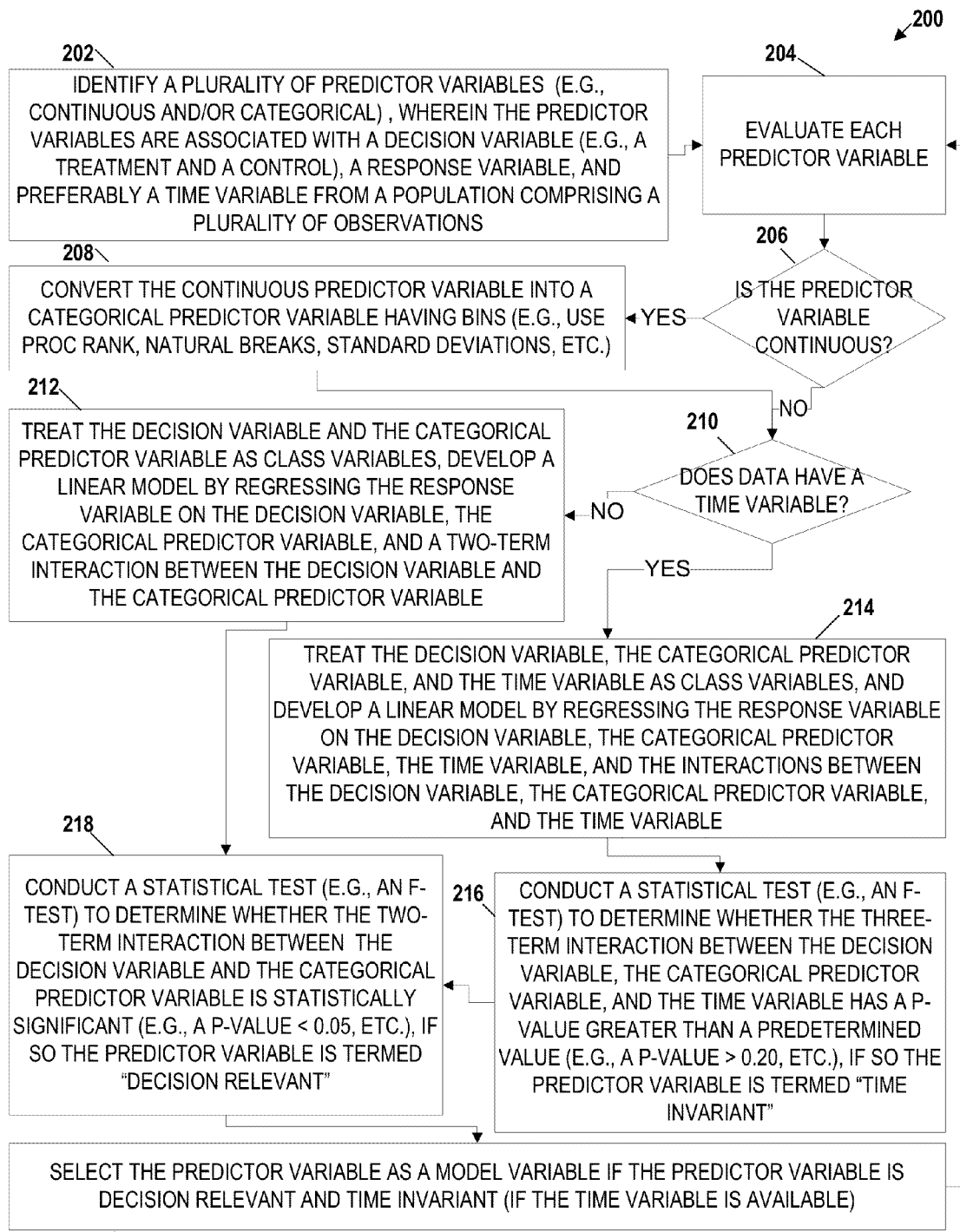
Figure 3:
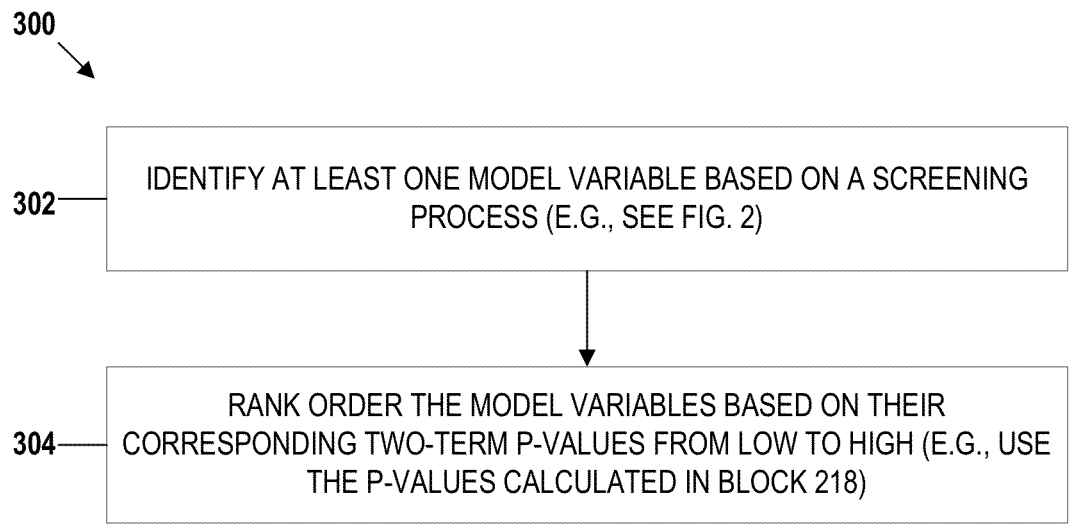
Figure 4:
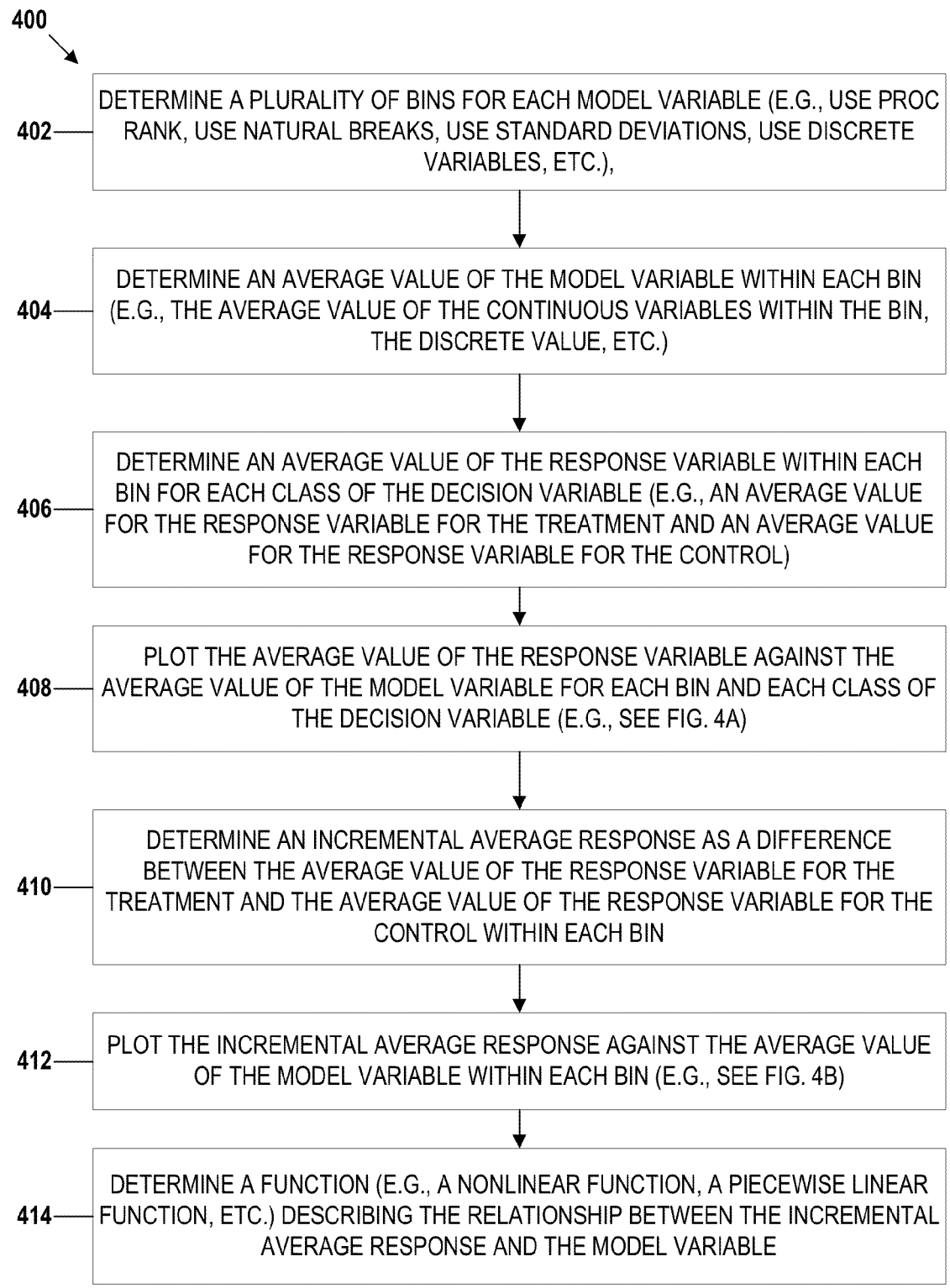
Figure 4A:
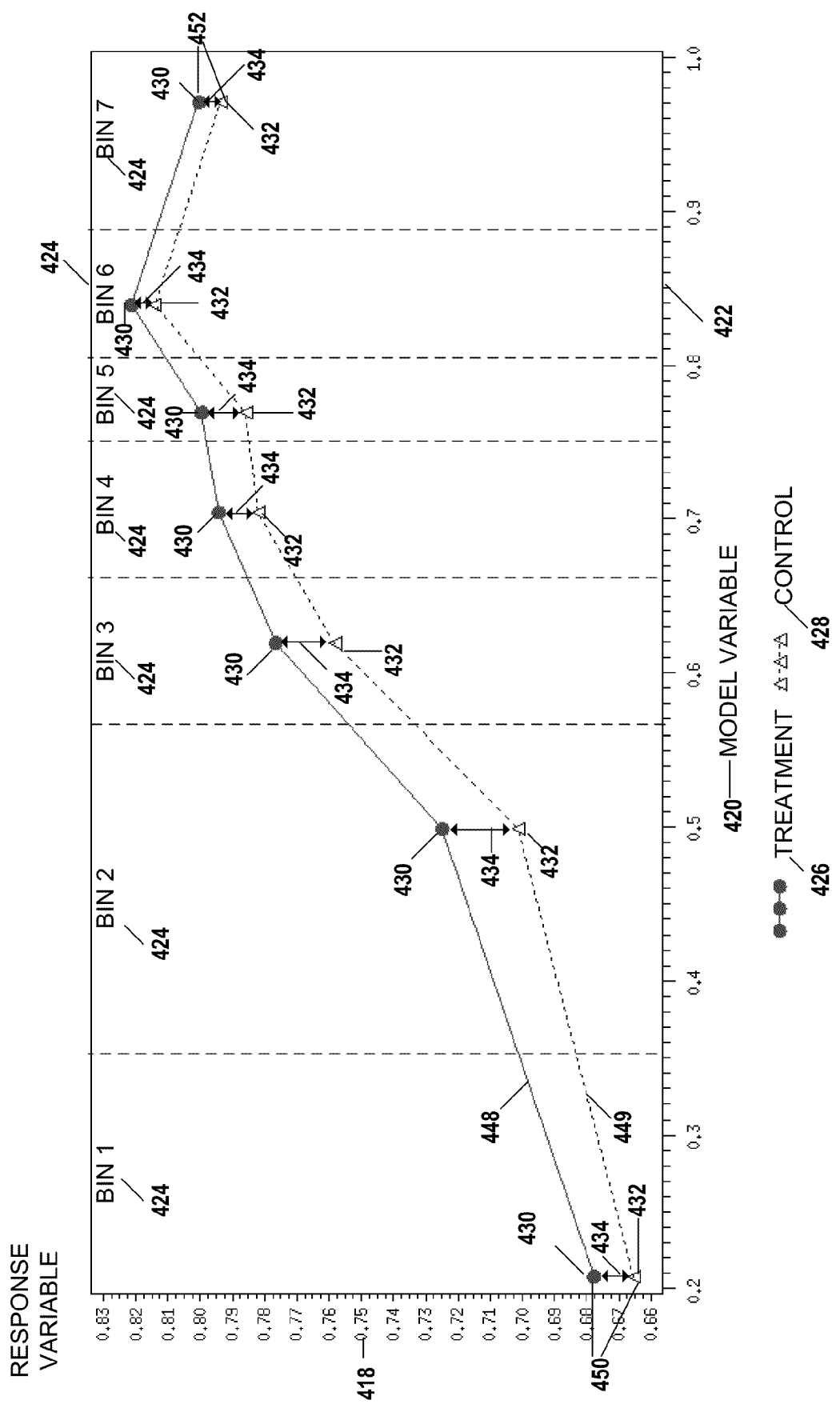
Figure 4B:
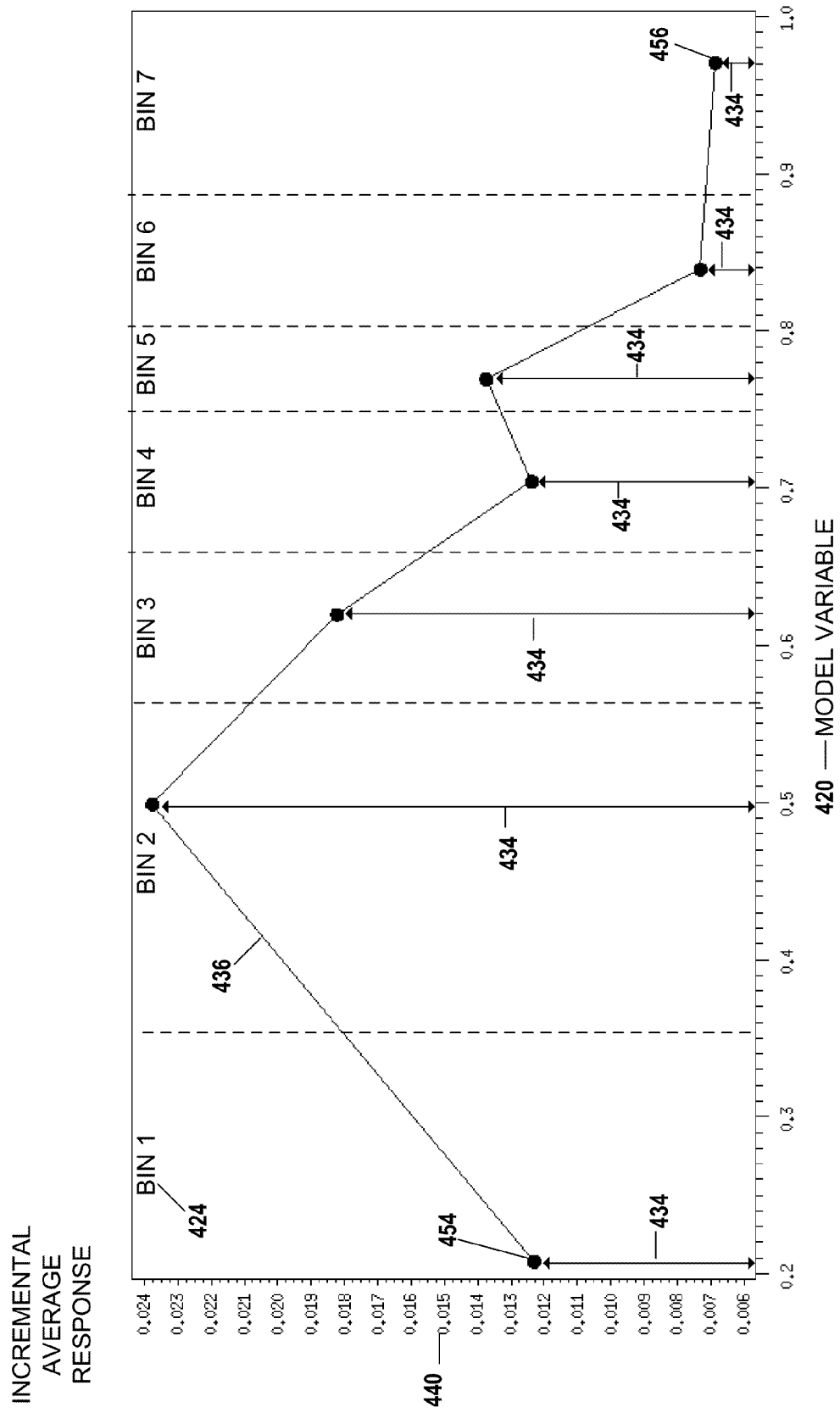
Figure 5:
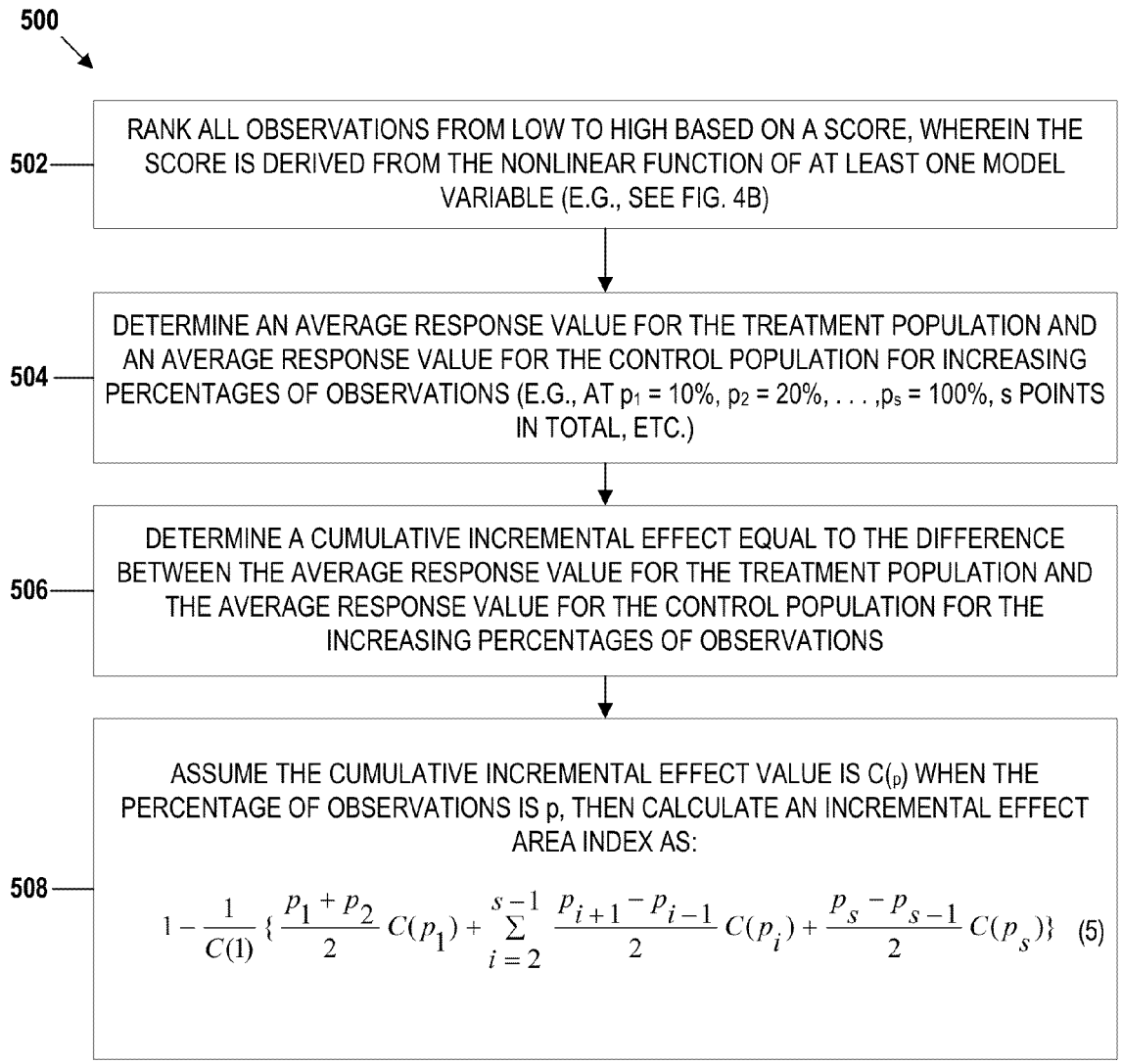
Figure 6:
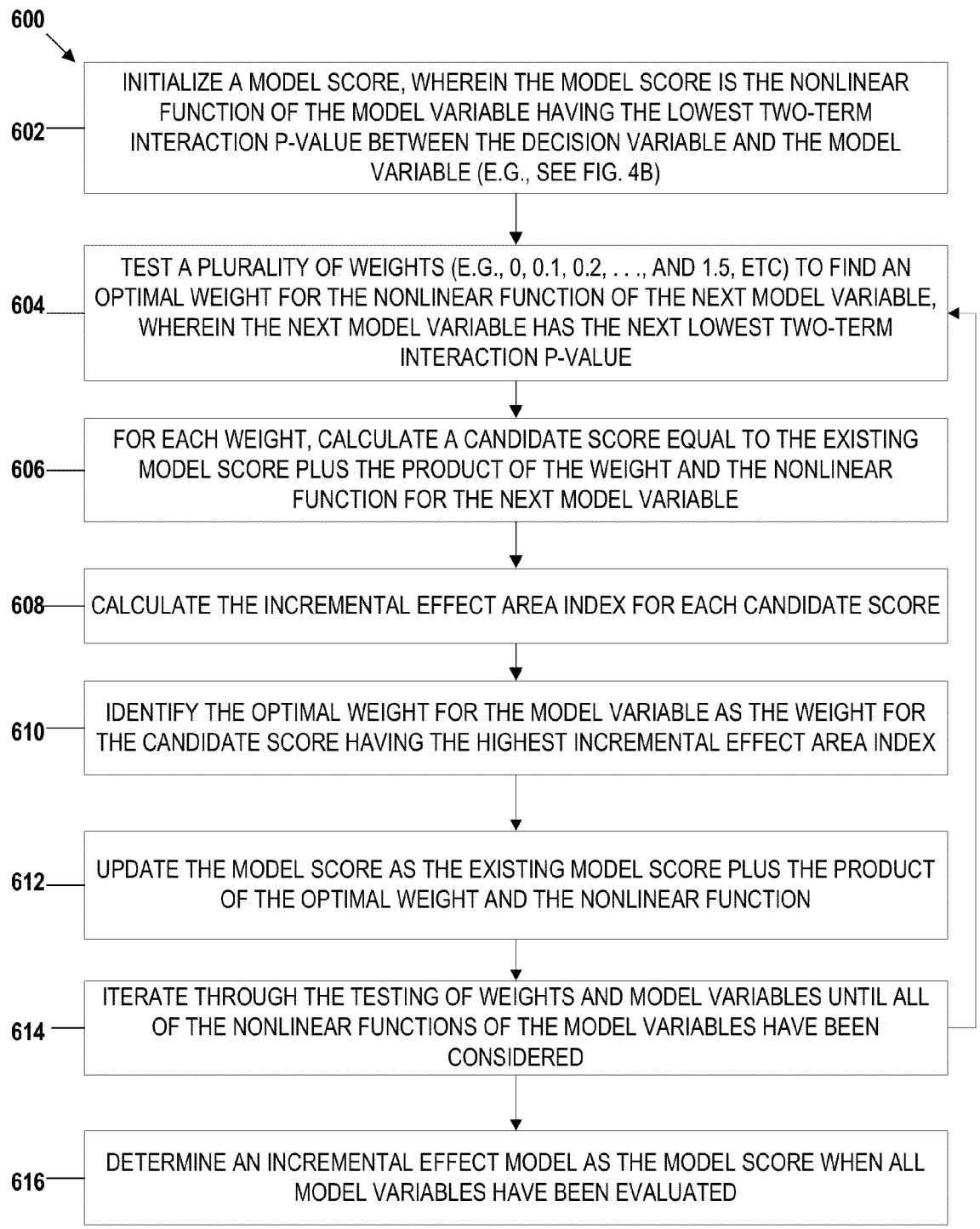
Figure 7:
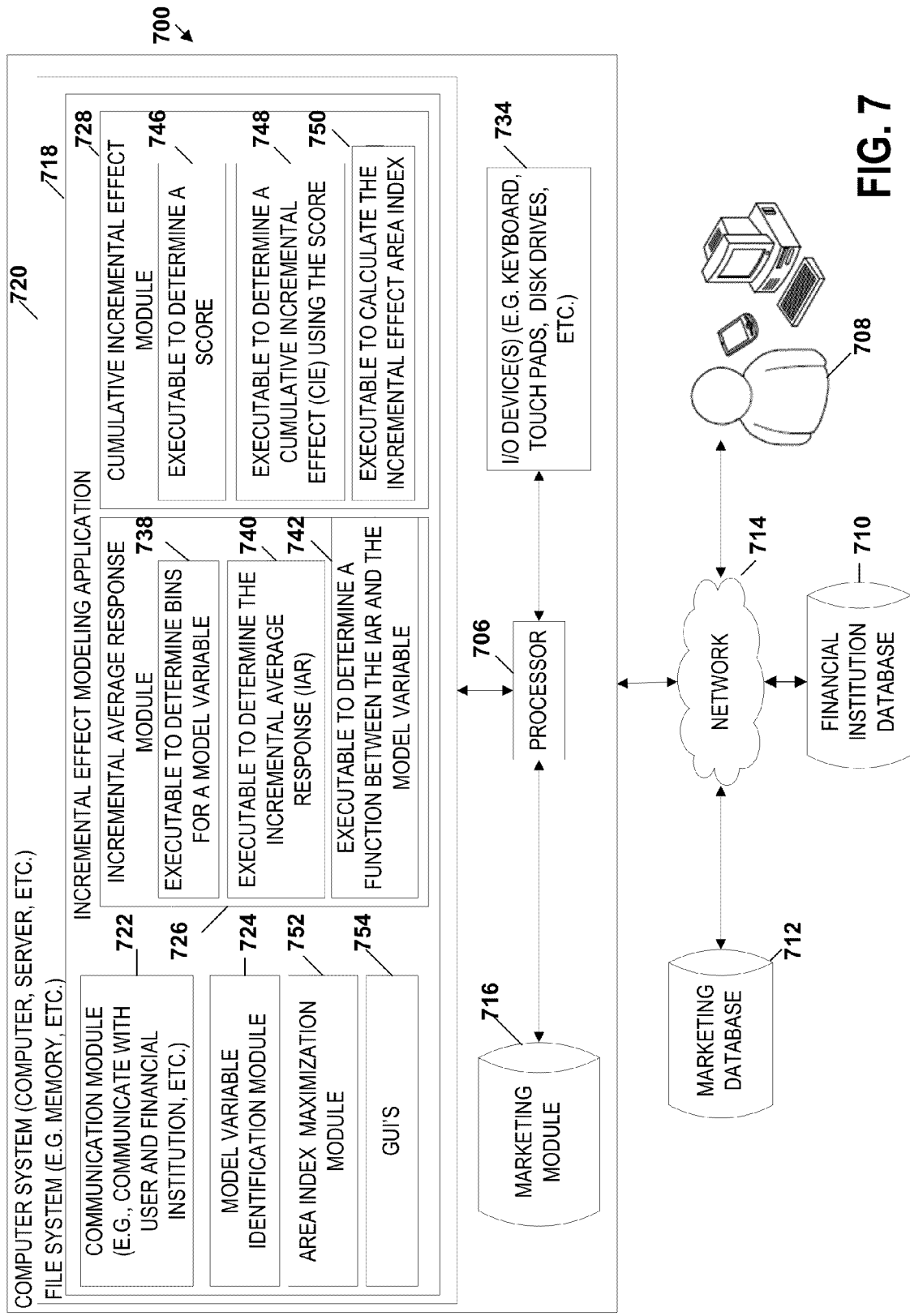
Figure 8:
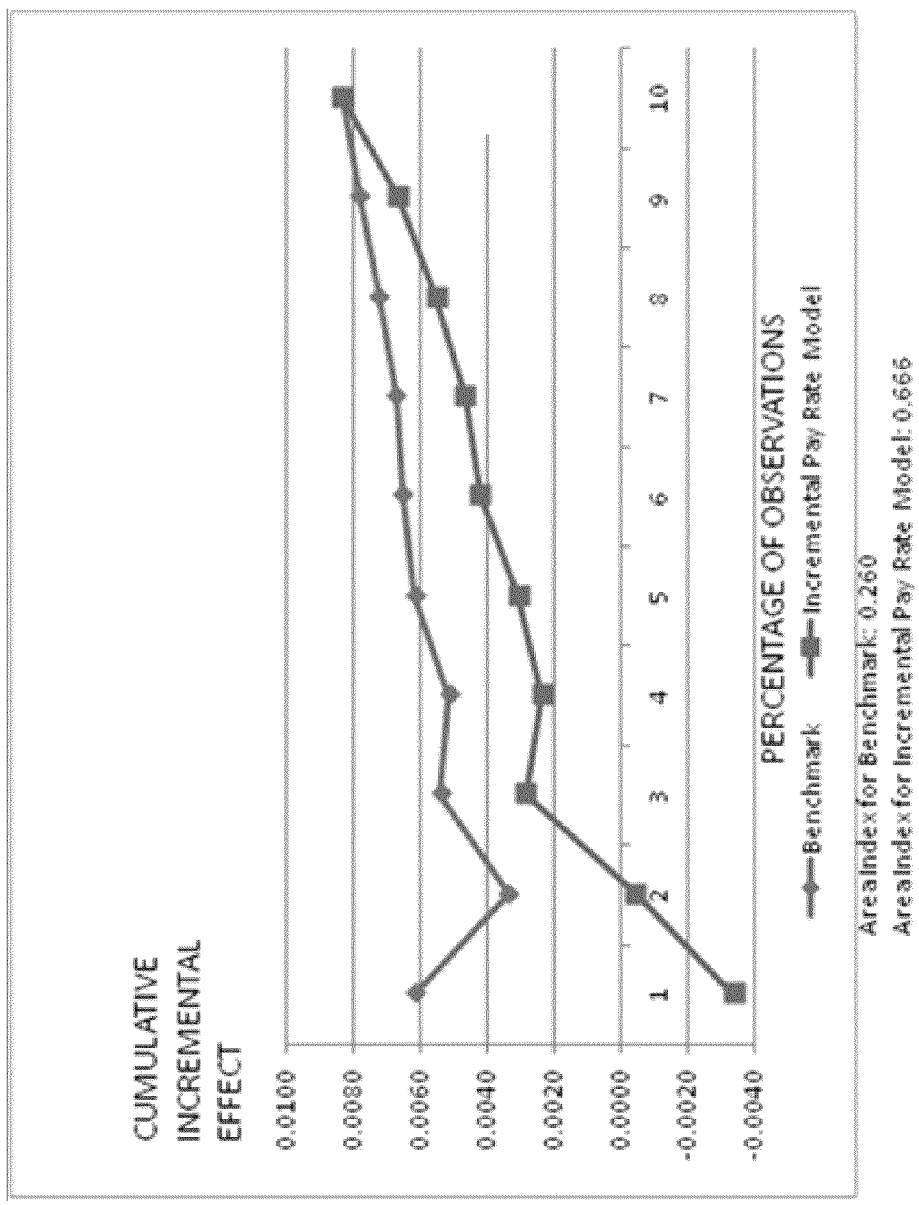
Figure 9:
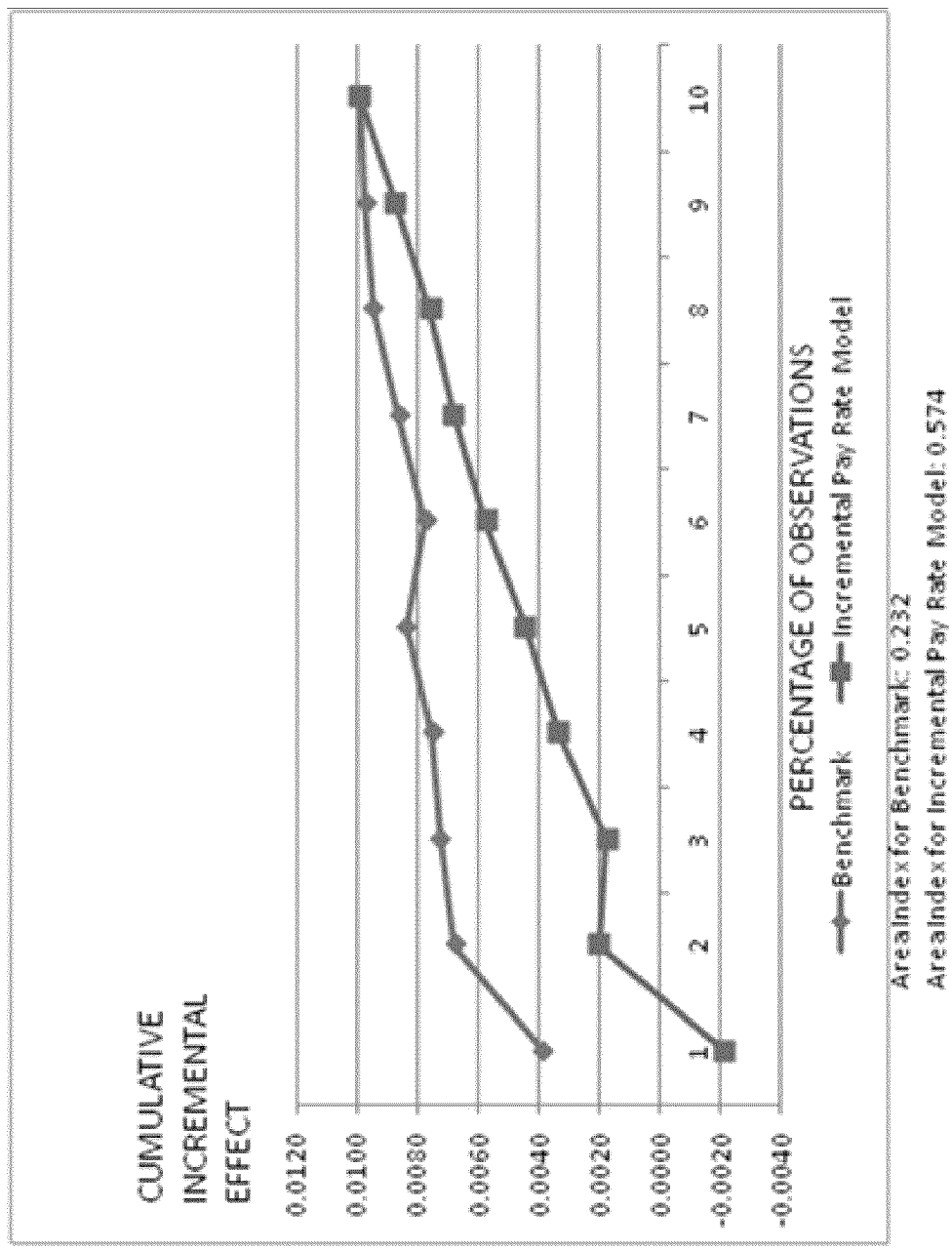

Having thus described embodiments of the invention in general terms, reference will now be made to the accompanying drawings, wherein:

FIGS. 1A-1C provides illustrations of the incremental effect area index, in accordance with one embodiment of the present invention;

FIG. 1D provides an example of a plot of the cumulative incremental effect against the increasing percentages of ranked observations wherein the incremental effect area index has a value greater than one, in accordance with one embodiment of the present invention;

FIG. 1E provides an example of a plot of the cumulative incremental effect against the increasing percentages of ranked observations wherein the incremental effect area index has a value less than zero, in accordance with one embodiment of the present invention;

FIG. 1 provides a high-level flow chart illustrating a computer-implemented method of determining an incremental effect model, in accordance with one embodiment of the present invention;

FIG. 2 provides a flow chart of a computer-implemented method of determining an incremental effect model wherein the model variables are determined, in accordance with one embodiment of the present invention;

FIG. 3 provides a flow chart of a computer-implemented method of determining an incremental effect model wherein the model variables are rank ordered, in accordance with one embodiment of the present invention;

FIG. 4 provides a flow chart of a computer-implemented method of determining an incremental effect model wherein a function is determined for each model variable, in accordance with one embodiment of the present invention;

FIG. 4A provides an example of a plot of the response variable against the model variable for the treatment and control based on binning, in accordance with one embodiment of the present invention;

FIG. 4B provides an example of a plot of the incremental average response against the model variable based on binning, in accordance with one embodiment of the present invention;

FIG. 5 provides a flow chart of a computer-implemented method of determining an incremental effect model wherein the incremental effect area index is determined from a given score, in accordance with one embodiment of the present invention;

FIG. 6 provides a flow chart of a computer-implemented method of determining an incremental effect model wherein the incremental effect model is determined based on the maximization of the incremental effect area index, in accordance with one embodiment of the present invention;

FIG. 7 provides a block schematic of an incremental effect modeling system, in accordance with one embodiment of the present invention;

FIG. 8 provides an example of a plot of the cumulative incremental effect against the increasing percentage of observations for a benchmark model and the incremental effect model for development data, in accordance with one embodiment of the present invention; and FIG. 9 provides an example of a plot of the cumulative incremental effect against the increasing percentage of observations for a benchmark model and the incremental effect model for an out-of-time validation, in accordance with one embodiment of the present invention.

DETAILED DESCRIPTION OF EMBODIMENTS OF THE INVENTION

Given the importance of the incremental effect area index to the incremental effect model, FIGS. 1A-1E depict conceptual graphs and equations for determining the incremental effect area index for a given incremental effect model score. Intuitively, if a score is good in rank ordering the incremental effect, an individual with a larger incremental effect score value is expected to have a larger incremental effect of treatment. The incremental effect area index is used for measuring the quality of a score in rank ordering the incremental effect.

Let $p$ be a value in $(0, 1]$ and $y$ be the dependent variable. For a given $100p\%$ of observations with lowest score values, calculate the average value of $y$ for the observations in test group, and the average value of $y$ for the observations in control group, then take the difference between the average $y$ in test and the average y in control. This difference is called the cumulative incremental effect corresponding to p, denoted as C(p). Thus, C(p) is a function of cumulative incremental effect defined in (0, 1]. Notice that C(p) is not defined at p=0, because C(0) represents the cumulative incremental effect for 0 percentage of observations, which cannot be obtained from the data.

In FIG. 1A, the cumulative incremental effect function C(p) is shown as the curve 120 (CB).

Conceptually, the incremental effect area index is defined by Equation (1). Equation (1) recites:

Incremental effect area index={area of region(*ABC*)}/ {area of rectangle(*ABEO*)}.

To be specific, the region ABC 124 is defined as the region above the cumulative incremental effect curve 120, below the horizontal line AB 122, and horizontally bounded between 0 and 1. Notice that the area of the region (ABC) is defined to have a sign. For instance, if the curve CB 120 is above the line AB 122, then the area of region (ABC) 124 has a negative value. Intuitively, the area of region (ABC) 124 is equal to the difference between the area of rectangle (ABEO) 126 and the area of the region (CBEO) 128. Hence equivalently, Equation (2) recites:

Incremental effect area index=1−{area of region (*CBEO*)}/{area of rectangle(*ABEO*)}.

Notice that the area of rectangle (ABEO) 126 is equal to 1 multiplied by the height of line (AB) 122. Hence it is equal to C(1), the cumulative incremental effect when 100% of the observations in the data are considered. Also notice that the region (CBEO) 128 is below the cumulative incremental effect curve, above the horizontal axis, and horizontally bounded between 0 and 1.

Mathematically, Equation (3) describes the incremental effect area index. Equation (3) recites:

$$\text{Incremental effect area index} = 1 - \frac{1}{C(1)} \int_a^1 C(p)\,dp$$

Here the integral is equal to the area of region (CBEO) 128, and C(1) is the cumulative incremental effect when all observations are considered. C(1) is a constant for any model score.

A good model score should have a large incremental effect area index. Assume there are two scores that rank order the observations, as shown in FIG. 1A: score 1 with a cumulative incremental effect function corresponding to the curve CB 120, and score 2 with a cumulative incremental effect function corresponding to the curve DB 130. Obviously, score 2 has a larger incremental effect area index than score 1, since the area of region ABD 132 is larger than the area of region ABC 124. Is score 2 better than score 1 in rank ordering incremental effect? The answer is of course yes. Based on the figure, for any given percentage of observations, the observations chosen by score 2 (with lowest score 2 values) have a lower cumulative incremental effect than the observations chosen by score 1 (with lowest score 1 values). That is, score 2 is better in identifying the individuals with the lowest incremental effect of treatment than score 1 for any given percentage of observations. In general, the greater the incremental effect area index a score has, the better the score tends to be in rank ordering the incremental effect of a treatment.

In practice, the incremental effect area index for a given score is calculated using an integral. In an embodiment, the computer-implemented method applies Simpson's method to calculate the integral. That is, the integral is evaluated as the sum of a number of small trapezoidal areas. A set of percentages of observations $p_1, p_2, \ldots, p_s$ (s points in total, say s=10, and take $p_s$=1) are selected and then the corresponding values of the cumulative incremental effect at these percentages: $C(p_1), C(p_2), \ldots, C(p_s)$ are calculated. See FIG. 1B.

As shown in FIG. 1C, the area of region (CBEO), which is equal to the integral, can be approximated by the sum of the areas of s trapezoids: $C_0\ C_1\ P_1\ O$, $C_1\ C_2\ P_2\ P_1$, $C_2\ C_3\ P_3\ P_2, \ldots, C_{s-2}\ C_{s-1}\ P_{s-1}\ P_{s-2}, C_{s-1}\ C_s\ P_s\ P_{s-1}$. Notice that the first trapezoid $C_0\ C_1\ P_1\ O$ is treated as a rectangle because C(0) (the length of $C_0 O$), the cumulative incremental effect for 0 percentage of observations, cannot be obtained from the data. In practice, a large enough $p_1$ (say let $p_1$=10%, or at least 5%) is selected so that there are enough observations to have a good estimate of $C(p_1)$, which is the length of $C_1 P_1$.

From this, Equation (4) is derived, which is a numerical approximation formula for the integral.

Equation (4) recites:

$$\int_0^1 C(p)\,dp \approx$$

$$\text{area(rectangle } C_0\ C_1 P_1 O) + \text{area(trapezoid } C_1 C_2 P_2 P_1) + \ldots +$$

$$\text{area(trapezoid } C_{s-2} C_{s-1} P_{s-1} P_{s-2}) + \text{area(trapezoid } C_{s-1} C_s P_s P_{s-1}) =$$

$$p_1 C(p_1) + \frac{p_2 - p_1}{2}(C(p_1) + C(p_2)) + \ldots +$$

$$\frac{p_{s-1} - p_{s-2}}{2}(C(p_{s-2}) + C(p_{s-1})) + \frac{p_s - p_{s-1}}{2}(C(p_{s-1}) + C(p_s)) =$$

$$\frac{p_1 + p_2}{2} C(p_1) + \sum_{i=2}^{s-1} \frac{p_{i+1} - p_{i-1}}{2} C(p_i) + \frac{p_s - p_{s-1}}{2} C(p_s)$$

Based on equation (3) and equation (4), Equation (5) is determined as an approximation formula for the incremental effect area index.

Equation (5) recites:

Incremental Effect Area Index ≈

$$1 - \frac{1}{C(1)} \left\{ \frac{p_1 + p_2}{2} C(p_1) + \sum_{i=z}^{z-1} \frac{p_{i+1} - p_{i-1}}{2} C(p_i) + \frac{p_s - p_{s-1}}{2} C(p_z) \right\}$$

In some embodiments, the percentages of observations are chosen as $p_i$=i/s for i=1, 2, ..., s, with s=10 or 20.

Typically, the incremental effect area index takes values between 0 and 1. In some embodiments, however, the incremental effect area index has a value of greater than 1 or less than 0. These embodiments will be discussed in FIG. 1D and FIG. 1E, respectively.

When a treatment has a negative impact on many individuals and the score does a good job in singling out those individuals by successfully giving very low score values to those individuals, then a part of the cumulative incremental effect curve might be below the horizontal axis. Hence it is possible that the area of the region (ABC) is larger than the area of rectangle (ABEO). This will lead to an incremental effect area index bigger than 1 (illustrated by FIG. 1D).

In FIG. 1D, the cumulative incremental effect is plotted against the observations ranked from low to high by the score. In this example, the model line plotting the relationship extends below the x-axis because the control has a greater incremental effect than the treatment until a large percentage of the observations are considered. As can be seen in FIG. 1D, the first area is defined by points A, B, and C, wherein point C is below the x-axis. The second area defined by points A, B, E, and O ends at the x-axis by definition. In the example depicted in FIG. 1D, the incremental effect area index based on Equation (1) is greater than 1 because the first area ABC is larger in size than the second area ABEO.

In some embodiments, the incremental effect area index could be less than 0 if a score does a poor job in rank ordering incremental effect and is worse than random selection. FIG. 1E is an example corresponding to this embodiment, where some parts of the cumulative incremental effect curve (CB) is above the line (AB) at times. FIG. 1E shows two regions above horizontal line (AB) but below the curve (CB) that contribute negative area values. The Figure also shows a region below the horizontal line (AB) and above the curve (CB), which contributes a positive area value. When summing up all three areas, the total area is negative. Hence incremental effect area index is negative. This concludes the discussion about the incremental effect area index.

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

It should be understood that terms like "bank," "financial institution," and "institution" are used herein in their broadest sense. Institutions, organizations, or even individuals that process financial transactions are widely varied in their organization and structure. Terms like "financial institution" are intended to encompass all such possibilities, including but not limited to banks, finance companies, stock brokerages, credit unions, savings and loans, mortgage companies, insurance companies, and/or the like. Additionally, disclosed embodiments may suggest or illustrate the use of agencies or contractors external to the financial institution to perform some of the calculations, data delivery services, and/or authentication services. These illustrations are examples only, and an institution or business can implement the entire invention on their own computer systems or even a single work station if appropriate databases are present and can be accessed.

At a high level, a computer-implemented method of determining an incremental effect model is provided. Businesses may use incremental effect models to determine the most effective use of resources. For example, a business may want to determine the most cost effective use of marketing funds. The business may use the marketing funds to contact customers (e.g., via email, phone, or mail, etc.) and encourage them to make a payment by the due date in the billing cycle. In this manner, the business encourages the customers to save money by reducing or eliminating finance charges. Not all customers, however, will be influenced by contact from the business and thus the resources used to reach out to that customer could be better used elsewhere. The incremental effect model assists the business in determining which customers will most likely be influenced by the contact and allows the business to target the resources accordingly.

The incremental effect model is used to determine the effect of a treatment on an individual's performance or response using at least one predictor variable. For example, the treatment may be whether an individual was contacted by the business. The response variable in the example is whether the customer makes a payment by the due date. Businesses, such as financial institutions, may collect data on customers. The businesses can evaluate this data and identify predictor variables that may be associated with the response variable. For example, businesses may keep records on the percent of pay periods in a previous time period that the customer made a payment on the credit card, the average balance in the customer's checking account, whether the customer has an automatic payment set up, or varied other predictor variables that may be associated with whether the customer makes a payment on the credit card bill.

While the examples provided in this disclosure are related to determining an incremental effect model used in marketing strategies, it should be understood that the computer-implemented methods, apparatuses, and computer program products described herein can be used to determine the incremental effect for any kind of treatment. For example, the computer-implemented method described herein can be used to determine the incremental effect of capital improvements to a business, credit cards, consumer lending products, mortgages, home equity line of credit, auto loans, and personal loans, etc.

FIG. 1 provides a high level flow chart of a computer-implemented method of determining an incremental effect model 100, in accordance with one embodiment of the present invention. In an embodiment shown in block 102, the computer-implemented method identifies data comprising a response variable, a decision variable (e.g., a treatment and a control), and a plurality of predictor variables from randomized test data. In the randomized test data, observations (individuals or accounts) are randomly selected for treatment (test) or no treatment (control). In an exemplary embodiment, the randomized test has run for multiple months so that there is a better chance to develop a model that performs well for multiple months and thus will more likely hold in the future. As a rule of thumb, the data should be large, say, include at least 10,000 observations in the treatment group and 10,000 observations in the control group. In a still further embodiment, a T-test or an asymptotic Z-test is conducted prior to developing the incremental effect model to check whether the treatment group and the control group have statistically different mean response values. If the answer is no, additional data may be gathered to develop the incremental effect model.

In some embodiments, the predictor variables are natural categorical variables, such as state, whereas in other embodiments the predictor variables are continuous variables that need to be converted to categorical variables through binning, in order to check if they are helpful in predicting the incremental effect. The continuous variables may be converted to categorical variables by use of proc rank in SAS, and use of natural breaks.

In some embodiments, the computer-implemented method 100 determines a set of model variables from a plurality of predictor variables, wherein each model variable is decision relevant and preferably time invariant, as shown in block 104. Decision relevant means that the incremental effect of the decision (treatment or no treatment) on the response variable depends on the value of the model variable. In other words, when the model variable values differ for observations, the net impact of the decision on the response variable could be significantly different. The computer implemented method uses an F-test to check if a 2-term interaction between the model variable and the decision variable is significant, and thus to determine if the model variable is decision relevant, with details given in FIG. 2.

In one embodiment, the data includes a time variable, such as a variable that indicates which month over a plurality of months the treatment occurred, or which campaign over a plurality of campaigns the treatment occurred. The computer implemented method uses an F-test to check if a 3-term interaction associated with the time variable, the decision variable, and the model variable is significant, thus to determine if the model variable is time invariant, or showing a consistent pattern of incremental effect over different times. The method uses another F-test to check if the variable is decision relevant. Further details are given about the F-tests in FIG. 2. Building a model based on variables that are time invariant makes the model more robust and more likely to hold on out of time data validation. If a variable shows a consistent pattern over multiple months in historical data, the pattern is more likely to hold in the future. On the other hand, building a model on the variables that are decision relevant makes the model useful for optimal decision making. If a variable is not decision relevant, then the decision's effect on the individual is not related to the value of the – variable. Note that both the concept of decision relevant and the concept of time invariant are related to the interaction associated with the model variable and the decision variable.

In block 106, the processor rank orders the model variables for use in the incremental effect model. In an embodiment, the processor ranks the model variables based on the significance of the two-term interaction between the model variable and the decision variable, as discussed further in FIG. 3. The model variables are ranked in order of significance so that the model variable with the most significant relationship with the decision variable is used as a baseline for the incremental effect model and less significant model variables are evaluated in relation to the most significant model variable.

In block 108, for each model variable the computer-implemented method determines a function approximately describing the relationship between the incremental effect (incremental average response) and the model variable empirically. The incremental effect is evaluated as the difference between the average value of the response variable for the treatment and the average value of the response variable for the control within bins created by the categorical model variables. For example, a continuous model variable, e.g., percent of time that an individual has made a payment on a credit card over the previous twelve months, can be converted into a categorical model variable, e.g., groups of individuals defined at 0-10%, 11-30%, 31-65%, 66-80%, 81-95%, and 96-100%. As will be discussed, the categories can be defined in a variety of ways, such as by using proc rank, natural breaks, standard deviations, etc., and the categories can differ in the number of individuals placed within each category. Bins are defined by the categories. For example, in the above examples, the first bin would include all individuals that made a payment on the credit card over the previous twelve months between 0 and 10% of the time. Within each bin, the average response variable for treatment individuals and the average response variable for control individuals are determined. The computer-implemented method then determines the difference between the average response variable for treatment individuals and the average response variable for control individuals, as shown in FIG. 4A. The computer-implemented method plots the difference, termed the incremental average response, against the average model variable within each bin, as shown in FIG. 4B. The computer-implemented method then determines a function to describe the relationship between the model variable and the incremental average response, as will be discussed in greater detail in FIG. 4. It should be understood that the plots shown in FIG. 4A and FIG. 4B are presented for illustrative purposes only. The computer-implemented method is capable of determining the function without plotting out the relationship between the incremental average response and the model variable.

Turning now to block 110, the computer-implemented method determines a weight for the nonlinear function of each of the model variables, wherein a score equal to the sum of the weighted nonlinear functions achieves the maximum value of an incremental effect area index. An example of the nonlinear function for a model variable is shown in FIG. 4B. A function of this sort is determined for each model variable.

Without loss of generality, let us assume there are k model variables $X_1, X_2, \ldots, X_k$, and the corresponding nonlinear functions of these k model variables are $U_1, U_2, \ldots, U_k$. We want to determine $w_1, w_2, \ldots, w_k$, the weights of the nonlinear functions, so that the score $w_1*U_1/+w_2*U_2+ \ldots +w_k*U_k$ has the largest incremental effect area index.

As an example, we illustrate a forward stage-wise selection procedure to conduct the weight search, based on a grid search in the interval [0, 1.5]. We do not consider negative weights here.

First, initialize the weight and the score: $w_1=1$, $S_1=w_1*U_1$.

Now consider $U_2$. Determine its weight $w_2$ from $\{0, 0.1, 0.2, 0.3, \ldots, 1.4, 1.5\}$. Create the following 16 candidate scores: $S_1+0.00*U_2$, $S_1+0.10*U_2$, $S_1+0.20*U_2$, ..., $S_1+1.50*U_2$. For each of these 16 candidate scores, find the corresponding incremental effect area index. Let $w_2$ be the weight that is corresponding to the largest incremental effect area index. Then update our score as $S_2=S_1+w_2*U_2$.

Now consider $U_3$. Determine its weight $w_3$ from $\{0, 0.1, 0.2, 0.3, \ldots, 1.4, 1.5\}$. Create the following 16 candidate scores: $S_2+0.00*U_3$, $S_2+0.10*U_3$, $S_2+0.20*U_3$, ..., $S_2+1.50*U_3$. For each of these 16 candidate scores, find the corresponding incremental effect area index. Let $w_2$ be the weight that is corresponding to the largest incremental effect area index. Then update our score as $S_3=S_2+w_3*U_2$.

We keep iterating this weight searching process, until all k variables have been considered. This will bring us to block 112.

In block 112, the computer-implemented method determines the final incremental effect model as the sum of the weighted nonlinear functions when the incremental effect area index is maximized. FIG. 5 and FIG. 6 will give more details about the weight search step.

Why do we search the weight $w_i$ only between 0 and 1.5 for i>1? First, we explain why we set the upper limit as 1.5. There are 3 reasons. 1) At the beginning, we set $w_1=1$ for $U_1$, the nonlinear transformation of the best model variable. By intuition, we know that very likely the other weights should not be much bigger than 1 in the optimal score because the other variables are not better (at least when being looked at individually). 2) Searching in a relatively small interval saves time. 3) We don't want any variable to have a very big weight which makes it dominate the final score. What if the relation between the incremental effect and the model variable with a huge weight cannot hold in the future? In this case this variable alone may very likely screw up the model score. Next, we explain why we allow the weight to be 0. The reason is that we want to have a chance to check if the model score is better by leaving out the nonlinear transformation of the model variable that is being considered. Some model variables could hurt the quality of the score when other correlated variables have been already included in the model score.

We feel that a grid search from 16 possible values $\{0, 0.1, 0.2, \ldots, 1.5\}$ is usually adequate. Of course, a more granular search in a broader interval is possible. Another possible alternative for grid search would be golden section search, or the 0.618 search.

The flow chart of FIG. 1 illustrates general principles and embodiments of the system and computer-implemented method of determining an incremental effect model. The examples included above are not limiting and as will be discussed in greater detail later additional steps and or features may be included in the systems and computer-implemented methods.

Turning now to FIG. 2, a detailed flow chart of a computer-implemented method of determining model variables for inclusion in the incremental effect model. In one embodiment, the steps include identifying a plurality of predictor variables, converting the predictor variables into categories if appropriate, regressing a response variable on the predictor variable, a decision variable, and preferably a time variable, plus their interactions, and then identifying the predictor variables where the interaction between the decision variable and the predictor variable is statistically significant. In a further embodiment, the computer-implemented method identifies predictor variables that are time invariant based on the interaction between the time variable, the decision variable, and the predictor variable.

In block 202, the computer-implemented method identifies a plurality of predictor variables (continuous or categorical). The predictor variables are associated with a decision variable (treatment or control), a response variable, and preferably a time variable. The predictor variables may be derived from data collected by a financial institution. An example of a predictor variable may be the average balance in a checking account. Predictor variables may also include the frequency with which an individual makes a payment on a credit card, the number of automated teller machine withdrawals a month, the amount of quasi-cash transactions in the previous month, etc. The predictor variables may be a relative value, such as a percent of time or a comparison to a standard. Some predictor variables may be an exact amount, such as the amount in an account or the number of times that a minimum payment was made. In an embodiment, the predictor variables are continuous variables such as an amount. In a further embodiment, the predictor variables are categorical variables such as an account type. It should be understood that the example predictor variables are but a few of the many options that one skilled in the art would identify given the teachings herein. Computer-implemented systems are capable of capturing detailed data on customers and transforming that data into a variety of predictor variables.

In order to determine variables for inclusion in the incremental effect model, the computer-implemented method evaluates each predictor variable through a variable screening process, as depicted by block 204. First, the computer-implemented method determines whether the predictor variable is continuous or categorical, as shown in block 206. If the predictor variable is continuous, the computer-implemented method converts the continuous predictor variable into a categorical predictor variable, as shown in block 208. In an embodiment, the computer-implemented method converts the continuous predictor variable into a categorical variable using an algorithm, such as the SAS procedure PROC RANK. In an embodiment, the number of categories for a continuous variable is predetermined, such as 10 categories (10 bins).

The decision variable, such as treatment versus control, is a binary variable to indicate whether an individual receives the treatment or does not receive the treatment (in control). The decision variable may be any type of binary variable that can be applied to observations within the population. In an exemplary embodiment, the decision variable is a marketing treatment such as a contact with a customer. The customer receiving the treatment may receive an email, a phone call, a text message, a social networking contact, a letter, or a visit from an individual, etc.

In some embodiments, the treatment requires resources be expended. For example, mail may cost postage or a phone call may require an employee's time. The incremental effect model assists the financial institution in expending these resources in a more efficient manner.

The response variable is the variable of interest. The incremental effect model determines the net effect of the treatment on the response variable at individual level. In some embodiments, the response variable is an 1-0 binary variable, indicating whether or not a customer has taken an action that the financial institution wishes to encourage. For example, the action may be the customer making a payment, transferring funds, opening an account, or contacting the financial institution. In further embodiments, the response variable can be payment amount, revenue amount, loss amount, or profit amount in a certain period associated with the customer.

The population is the collection of observations that are used to construct the model. In an embodiment, the population is a group of customers of the financial institution. The population may be a test population that represents the financial institution's customers as a whole or represents subsets of the financial institution's customers. In an embodiment, the population is large enough that the model constructed from the population will have sufficient power to predict the incremental effect of a treatment based on at least one predictor variable. In some embodiments, the population is a group selected from the system for which the incremental effect model is intended. For example, the population may be customers from a financial institution and the model may be created to apply to additional or future customers of the financial institution. In another embodiment, the population may be separate from the model. For example, the population may be from census data and the model may be applied to customers of the financial institution.

Turning now to block 210, the computer-implemented method determines whether the data has a time variable. If the data does not have a time variable, the computer-implemented method treats the decision variable and the (categorical) predictor variable as class variables and develops a linear model by regressing the response variable on the decision variable, the categorical predictor variable, and the two-term interaction of the decision variable and the categorical predictor variable, as shown in block 212. In some embodiments, the regression is conducted using a procedure in a statistical package, such as using a PROC GLM in SAS™. As an alternative, logistic regressions may be used if the dependent variable Y is binary.

In block 214, the computer-implemented method then conducts a statistical test, such as an F test (assuming a linear model is developed in block 210), to determine whether the two-term interaction between the decision variable and the (categorical) predictor variable is statistically significant. In an embodiment, a p-value of less than 0.05 indicates that the two-term interaction is significant. In other embodiments, a p-value cut-off 0.10, 0.01, or 0.001 may be used. If the p-value for the two-term interaction is less than a pre-specified cut-off value, the predictor variable is termed "decision relevant". A variable is decision relevant if the decision's incremental effect on the response variable depends on this variable's value.

Notice that when a logistics regression is developed in block 210, the F-test in block 214 would need to be replaced by a chi-square test, based on a likelihood ratio test or deviance test. For the purpose of variable screening, the F-test based on a linear model is good enough in practice. Thus going forward, only the F-test based on a linear model will be discussed.

If the predictor variable is decision relevant and the data does not have a time variable, the computer-implemented method selects the predictor variable as a model variable, as shown in block 220, and then continues to evaluate additional predictor variables, as shown in block 204, until all predictor variables have been evaluated.

Turning now to block 214, if the predictor variable is associated with a time variable, the computer implemented method treats the (categorical) predictor variable, the decision variable, and the time variable as class variables and develops a linear model by regressing the response variable on the decision variable, the (categorical) predictor variable, the time variable, the two-term interaction between the decision variable and the predictor variable, the two-term interaction between the decision variable and the time variable, the two-term interaction between the predictor variable and the time variable, and the three-term interaction of the decision variable, the predictor variable, and the time variable. In an embodiment, a procedure in a statistical package, such as PROC GLM in SAS™, may be used. Again, logistic regressions may be used when the dependent variable is binary.

In block 216, the computer-implemented method conducts a statistical test, such as an F-test (assuming a linear model is developed in block 214), to determine whether the three-term interaction between the decision variable, the predictor variable, and the time variable has a p-value greater than a pre-determined value. For example, the computer-implemented method may determine whether the p-value is greater than 0.20 or 0.30. It should be understood that the computer-implemented method may determine higher or lower p-value for the cut-off. When the three-term interaction is not statistically significantly different from zero and has a large p-value, there is no strong evidence from the data to say that the impact of the two-term interaction between the decision variable and the predictor variable on the response variable relies on time T, or changes over time T. This implies that the incremental effect pattern shown by the two-term interaction is time invariant, or consistent over time. Therefore, if the p-value is greater than the pre-determined value, then the predictor variable is termed "time invariant." In an embodiment, this test is used by the computer-implemented method to exclude those variables that do not have a consistent pattern over time.

In an embodiment, after determining whether the predictor variable is time invariant, the computer-implemented method determines whether the predictor variable is decision relevant, as shown in block 218 and discussed previously, and selects predictor variables that are both decision relevant and time invariant for inclusion in the incremental effect model, as shown in block 220.

Turning now to FIG. 3, a detailed flow chart of a computer-implemented method of rank ordering the model variables based on p-values 300. The computer-implemented method comprises identifying at least one model variable, calculating a p-value for the interaction between the decision variable and the model variable, and rank ordering the model variables based on the p-value.

In block 302, the computer-implemented method identifies at least one model variable based on a screening process. In an exemplary embodiment, the model variable is identified through the process disclosed in FIG. 2. More than one model variable can be selected from the plurality of predictor variables.

Turning now to block 304, the computer-implemented method rank orders the model variables based on their corresponding two-term p-values from low to high. The p-values calculated in block 218, i.e., the two-term p-values based on the interaction between the model variable and the decision variable, are used.

FIG. 4 provides a detailed flow chart of a computer-implemented method for determining a function describing the relationship between the incremental average response and the average value of the model variable 400.

In block 402, the computer-implemented method determines a plurality of bins for each model variable. In an embodiment, the bins are defined by the model variable. For example, a continuous model variable may have a value from 0 to 1, e.g., the variable may be the percent of time that an individual pays at least the minimum due on a credit card, scaled to from 0 to 1. The computer-implemented method has already converted the continuous variable into a categorical variable, such as by use of proc rank, or natural breaks. Each category captures a range of the continuous variable. FIG. 4A depicts an example wherein a continuous model variable 420 on the X-axis 422 has been converted into a categorical variable having, in this case, seven categories. Each category defines a bin 424. In FIG. 4A, bin 1 includes observations having a value for the model variable of between 0 and approximately 0.35. In the above example, this bin includes all individuals in the population that pay at least the minimum balance on the credit from 0% of the time to approximately 35% of the time. As can be seen in FIG. 4A, the bins do not have to be equal in size relative to the range in the model variable.

In block 404, the computer-implemented method determines an average value for the model variable within each bin. In one embodiment, the average value is determined for the continuous variable within each bin. Turning again to FIG. 4A, bin 2 includes all of the observations have a model variable value of between 0.35 and 0.57. In the example, the average value of the model variable for all of the individuals having a model variable between 0.35 and 0.57 is 0.50. In other words, for all individuals that are in the second bin, the average percent of time that the individuals pay at least the minimum due on the credit card is 50% of the time. As can be seen, the average value does not need to be at the midpoint of the bin. In an embodiment, each bin will have a single average value for the model variable. The model variables for the treatment and control individuals will be combined and a single average value will be obtained. In a further embodiment, if the model variable is naturally categorical then no average value is calculated. For example, if the model variable is state of residence then each bin will have a single state of residence. The model will be based on the categories rather than on bins comprising observations having a continuous variable. In further embodiments, the median or the mode is used instead of the average (i.e., mean).

In block 406, the computer-implemented method determines an average value of the response variable within each bin for each class of the decision variable. In other words, within each bin, the average value for the response variable for those individuals that received the treatment 426 is determined, and the average value for the response variable for those individuals in the control 428 is determined. For example, the treatment may be whether individuals receive an email on the day their credit card bill is due and the response variable may be whether they paid at least the minimum due on their most recent credit card bill. In bin 2 of FIG. 4A, the average value of the response variable 418 for those individuals in bin 2 that received the treatment was approximately 0.725, indicating that an average of 72.5% of the treated individuals within that bin have paid at least the minimum due on the most recent credit card bill. The control, or those individuals that did not receive an email, had an average response variable of approximately 0.695, indicating that an average 69.5% of the untreated individuals within that bin paid at least the minimum due on the most recent credit card bill.

In block 408, the computer-implemented method plots the average value of the response variable against the average value for the model variable for each bin and each class of the decision variable. As shown in FIG. 4A, each bin will have two points 430, 432 corresponding to the treatment and control for each bin, respectively. Both will have an x-value equal to the average value for the model variable within the bin. The two points will have y-values equal to the average response variable for the treatment and the control.

In block 410, the computer-implemented method determines an incremental average response as the difference between the average value of the response variable for the treatment and the average value of the response variable for the control within each bin, as indicated by arrows 434 for each bin. The difference is the range along the y-axis between the point for the treatment and the point for the control. As can be seen in FIG. 4A, the range between the treatment and the control may differ between the bins. In an embodiment, a line approximating the relationship between the response variable and the model variable for the treatment 448 and the control 449 is assumed to be horizontal to the left of points 450 and to the right of points 452.

Turning now to block 412, the computer-implemented method plots the incremental average response 440 against the average value of the model variable within each bin, as shown in FIG. 4B. In the plot shown in FIG. 4B, the x-values for the points within each bin are the same as the x-values for the points in FIG. 4A. The x-values are the average value for the model variables within each bin. The y-values of the points in FIG. 4B are equal to the difference between the treatment and the control points in FIG. 4A, as represented by arrows 434 for each bin. For example, the y-value for the point in bin 1 in FIG. 4B is approximately 0.012. This value is the difference between the y-value for the treatment (0.677) and the y-value for the control (0.665) in bin 1 of FIG. 4A.

In block 414, the computer-implemented method determines a function 436 describing the relationship between the incremental average response and the model variable. In an embodiment, a piecewise linear function is determined such that linear segments join points in adjacent bins, as shown in FIG. 4B.

FIG. 5 provides a detailed flow chart of a computer-implemented method for determining an incremental effect area index 500 based on a given score. It is a subroutine to be utilized in FIG. 6. In an embodiment, the computer-implemented method ranks all the observations from low to high based on a score, determines an average response value for the treatment population and an average response value for the control population for increasing percentages of observations with the lowest score values, determines a cumulative incremental effect at increasing percentages of observations with the lowest score values, and determines the incremental effect area index.

In block 502, the computer-implemented method ranks all observations from low to high based on a given score. The score might be a weighted sum of the functions of some model variables, with each function approximately describing the relationship between the incremental effect and a model variable.

In block 504, the computer-implemented method determines an average response variable for the treatment population and an average response variable for the control population for increasing percentages of observations with the lowest score values, at pre-defined points such as at 10%, 20%, . . . , 100%.

In block 506, the computer-implemented method determines a cumulative incremental effect equal to the difference between the average response variable for the treatment population and the average response variable for the control population for the increasing percentages of observations with lowest score values, at pre-defined points.

In block 508, the computer-implemented method assumes that the cumulative incremental effect value is C(p) when the percentage of observations is p and calculates the incremental effect area index using Equation (5):

$$\text{Incremental Effect Area Index} \approx \\ 1 - \frac{1}{C(1)} \left\{ \frac{p_1 + p_2}{2} C(p_1) + \sum_{i=z}^{z-1} \frac{p_{i+1} - p_{i-1}}{2} C(p_i) + \frac{p_s - p_{s-1}}{2} C(p_s) \right\}$$

In practice, we typically choose s=10, or 20, $p_i$=i/s (for i=1, 2, . . . , s).

Turning now to FIG. 6, a detailed flow chart of a computer-implemented method for determining an incremental effect model 600. In an embodiment, the incremental effect model is used to determine who within a population of individuals should receive a treatment in order to maximize the cost effectiveness or return on investment of the treatment.

In an embodiment disclosed in block 602, the computer-implemented method initializes a model score, wherein the model score is the nonlinear function of the model variable having the lowest two-term interaction p-value between the decision variable and the model variable. Initializing a model score means determining a model score to start with.

In block 604, the computer-implemented method tests a plurality of weights to find an optimal weight for the nonlinear function of the next model variable, wherein the next model variable has the next lowest two-term interaction p-value. For example, the weights may range from 0 to 1.50 at 0.1 increments (or 0.15 increments). It should be understood however that the weights may have any value and any increment between the weights. When the weight is greater, the nonlinear function of the model variable tends to have a greater contribution to the score. When the weight is zero, the computer-implemented method is evaluating whether the score is better without the nonlinear function of the model variable, i.e., whether the additional model variable should be dropped out of the model.

In block 606, for each weight the computer-implemented method determines a candidate score equal to the existing model score plus the product of the weight and the nonlinear function for the next model variable. There will be a candidate score for each weight tested.

Turning to block 608, the computer-implemented method determines the incremental effect area index for each candidate score. FIG. 5 discusses a method of determining the incremental effect area index based on any given score, in accordance with an embodiment of the invention. Some of the incremental effect area index score may be lower than the existing incremental effect area index, some may be equal to the existing incremental effect area index (e.g., when the weight is zero), and some may be greater than the existing incremental effect area index.

In block 610, the computer-implemented method identifies the optimal weight for the model score as the weight for the candidate score having the highest incremental effect area index. For example, of the sixteen candidates scores based on the sixteen weights, only one may result in the highest incremental effect area index and will be selected as the optimal weight for the model variable under consideration.

Turning now to block 612, the computer-implemented method updates the model score as the existing model score plus the product of the optimal weight and the nonlinear function. In this manner, the model score is improved by addition of model variables that result in a higher incremental effect area index and hence are better at rank ordering observations based on incremental effect.

In block 614, the computer-implemented method iterates through a plurality of weights for each nonlinear function of the model variables, until all nonlinear functions have been evaluated.

In block 616, the computer-implemented method determines the incremental effect model as the model score when all model variables have been evaluated. The final model score having the highest incremental effect area index may include a subset of the model variables identified through the screening process because some of the model variables will drop out when it is determined that the appropriate weight for them is zero. In an embodiment, the incremental effect model can be used to target a treatment to those individuals that the treatment is most likely to influence.

FIG. 7 is a schematic block diagram of an incremental effect modeling system 700, in accordance with an embodiment of the invention. In some embodiments, the system 700 includes a computer system such as a computer or server, etc. In an exemplary embodiment, the incremental effect modeling system is a server including a communication device 704 and a processing device 706. In some embodiments, the system interacts with a user 708, a financial institution database 710, and a marketing database 712 over a network 8714.

The network 714 may be a global area network (GAN), such as the Internet, a wide area network (WAN), a local area network (LAN), a wifi network, a 3G or 4G network or any other type of network or combination of networks. The network 714 may provide for wireline, wireless, or a combination of wireline and wireless communication between devices on the network.

As used herein, the term "processing device" generally includes circuitry used for implementing the communication and/or logic functions of a particular system. For example, the processing device 706 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 706 may include functionality to operate one or more software programs based on computer-readable instructions thereof, which may be stored in the memory device 702.

The processing device 706 is operatively coupled to the communication device 704. The processing device 706 uses the communication device 704 to communicate with the user 708, the financial institution database 710, and/or the marketing database 712.

As further illustrated in FIG. 7, the incremental effect modeling system includes computer-readable instructions 720 stored in a file system, which in one embodiment includes the computer-readable instructions 720 of an incremental effect modeling application 718.

In the embodiment illustrated in FIG. 7 and described throughout much of this specification, the incremental effect modeling application 718 allows for communication between a communication module 722, a model variable identification module 724, an incremental average response module 726, an incremental effect area index module 728, and an area index maximization module 752 to send, receive, and store information related to the incremental effect modeling system, determine the incremental effect model, determine which individuals should receive treatment based on the incremental effect model, and provide the treatment to the identified individuals.

Specifically, the communication module 722 facilitates communication between the incremental effect modeling system and the user 708. In some embodiments, the user is an employee of the financial institution that offers marketing or outreach to customers. By using the system and computer-implemented method provided herein, the employee can determine whether a marketing program is beneficial. In one embodiment, the communication module 722 controls the communication devices associated with the system. For example, the communication module 722 may automatically contact individuals for whom the incremental effect modeling system predicts outreach or contact would be beneficial. In another example, the communication module 722 can control I/O devices such as keyboards, screens, touchpads, etc. 734.

The communication module 722 also communicates with the marketing database 712 to receive marketing information. In an embodiment, the communication module 722 receives a plurality of predictor variables associated with a population as well as information on which customers received a treatment. In some embodiments, the communication module 722 communicates with the marketing module 716 to treat individuals that the incremental effect modeling application 718 predicts will be influenced by the treatment.

In some embodiments, the model variable identification module 724 receives a plurality of predictor variables, response variables, and decision variables from the financial institution database 710 and/or the marketing database 712. In some embodiments, the model variable identification module 724 converts continuous predictor variables into categorical predictor variables, such as by use of proc rank. In further embodiments, the model variable identification module 724 determines bins based on the categorical predictor variables. The model variable identification module 724 is configured to identify model variables that are decision relevant based on a significant two-term interaction between the decision variable and the predictor variable. In some embodiments, the model variable identification module 724 excludes predictor variables that are not consistent over time. For example, the model variable identification module 724 may exclude model variables wherein the interaction between a time variable, the model variable, and the decision variable has a low p-value (less than prespecified cutoff value, say 0.2 or 0.3). In still further embodiments, the model variable identification module 724 may rank order the identified model variables, such as by from low to high according to a p-value for the two-term interaction between the model variable and the decision variable.

In some embodiments, the incremental average response module 726 determines a function describing the relationship between the incremental average response and the model variable. In some embodiments, the incremental average response module 726 includes at least one of an executable to determine bins for a model variable 738, an executable to determine the incremental average response 740, and an executable to determine the function between the incremental average response and the model variable 742. The executables can be subroutines available to the incremental effect modeling application 718 and called up when input is received or output is needed.

In some embodiments, the executable to determine bins for a model variable 738 converts a continuous variable into a categorical variable. In an embodiment, the continuous variable is categorized by a method such as use of a subroutine in a statistical package (e.g., use of proc rank), use of natural breaks, or use of some measure of variation such as standard deviation. In an exemplary embodiment, the bins are defined based on the categories. For example, each bin may encompass all of the observations within a single category. In another embodiment, the bins are defined at least in part by user choice.

In some embodiments, the executable to determine the incremental average response 740 receives observation data from the financial institution database 710 and determines a difference between the average value of the response variable for the treatment and the average value of the response variable for the control within each bin defined by the module 738. In another embodiment, the executable to determine the incremental average response 740 determines the difference by plotting the average response variable for the treatment and the control against the average value for the model variable within each bin.

In an embodiment, the executable to determine a function between the incremental average response and the model variable 742 receives the incremental average response from the executable to determine the incremental average response 740 and plots the incremental average response against the average value of the model variable within each bin. In some embodiments, the executable to determine a function between the incremental average response and the model variable 742 determines a non-linear function to explain the relationship. In a further embodiment, the executable to determine a function between the incremental average response and the model variable 742 determines a piece-wise linear function. For example, the executable may determine linear functions between consecutive bins.

In some embodiments, the incremental effect area index module 728 determines the incremental effect area index. In some embodiments, the incremental effect area index module 728 includes at least one of an executable to determine a score 746, an executable to determine a cumulative incremental effect using the score 748, and an executable to determine the incremental effect area index based on the cumulative incremental effect 750. The executables can be subroutines available to the incremental effect modeling application 718 and called up when input is received or output is needed.

In an embodiment, the executable to determine a score 746 determines a score based on the function determined in the incremental average response module 726. In some embodiments, the executable to determine the score 746 weights the function. For example the function may be weighted by a weight of between 0 and 1.5 at 0.15 or 0.10 increments. If the weight is zero, the model variable being modified is excluded from the score. In an embodiment, the score is a function that can be used to rank order the observations given the observations' values for the predictor variable. In further embodiments, the score is the sum of multiple weighted functions derived from different model variables.

In some embodiments, the executable to determine a cumulative incremental effect 748 receives the ranked observations from the executable to determine a score 738 and plots the average response variable for the treated individuals and the control individuals for increasing percentages of observations. The executable to determine a cumulative incremental effect 748 then determines the difference, termed the cumulative incremental effect, between the average response value for the treated individuals and the average response value for the control individuals for increasing percentages of ranked observations.

In further embodiments, the executable to determine the incremental effect area index 750 determines the incremental effect area index given the function for the cumulative incremental effect $C(p)$ as a function the increasing percentages of observations (with the lowest score values) by using Equation (5):

$$\text{Incremental Effect Area Index} \approx$$
$$1 - \frac{1}{C(1)}\left\{\frac{p_1 + p_2}{2}C(p_1) + \sum_{i=z}^{z-1}\frac{p_{i+1} - p_{i-1}}{2}C(p_i) + \frac{p_z - p_{z-1}}{2}C(p_s)\right\}$$

In an embodiment, the area index maximization module 752 utilizes the incremental average response module 726 and the incremental effect area index module 728 to determine the incremental effect model. In an embodiment, the area index maximization module 752 determines the weights for the functions corresponding to model variables by selecting the weights to maximize the incremental effect area index. In some embodiments, a plurality of weights is tested for the second and succeeding model variables. For example, the weights may vary from 0 to 1.5 relative to the first model variable having a weight of 1. The area index maximization module 752 repeats the process for combinations of model variables and weights, determining the incremental effect area index based on the sum of the weighted functions of the model variables, until the incremental effect area index is maximized to determine the incremental effect model.

The incremental effect modeling application 718 also includes Graphical User Interfaces (GUI's) 754, in some embodiments. The GUI's 754 assist in communication between the user 708 and the system. GUI's 754 can also be provided that assist the user in utilizing the I/O devices 734, or any other feature of the incremental effect modeling system 700.

Example 1

Example 1 provides an explanation of the use of the computer-implemented method and system in loss prevention modeling in the credit card business. In this real project, the computer-implemented method and system was used to estimate the net benefit of a direct mail treatment on accounts which are one billing cycle past due. A randomized test was designed wherein a small portion of the population was set aside and the accounts were randomly assigned for direct mail treatment or no direct mail treatment with an equal likelihood of 0.5. This randomized test was kept running for 15 months and the 15 months of data were then collected for the analysis. The data from this randomized test has 763 predictors, with a dependent variable Y defined as the payment flag (indicating whether or not an account made a payment greater than or equal to the minimum due amount in the month), a decision variable D (the flag of direct mail treatment or no direct mail treatment), and a time variable T (indicating the calendar month).

In the analysis, the first ten months of data is used for model development, with 620,803 observations in total, 310,358 accounts in treatment group, and 310,445 accounts in control group; while the remaining five months of data is used for out of time validation, with 281,519 observations. The objective is to develop an incremental payment rate model to estimate an account's incremental effect in payment probability due to the direct mail treatment. Furthermore, the model may be used in a direct mail campaign for the purpose of reducing cost and increasing payment.

Within each bin, the mean of pctPaidSome and the average incremental payment rate (which is the difference between the average payment rate for accounts in the test group and the average payment rate for accounts in the control group) is calculated. Then the piecewise linear function, y_pctPaidSome, is generated, as follows:

```
ifpctPaidSome<=0.2080062953 then y_pctPaidSome=0.0123037442;
else if pctPaidSome<=0.619553449 then
y_pctPaidSome=0.0237712891+(pctPaidSome-0.4988316455)*-0.045854387;
else if pctPaidSome<=0.7042053466 then
y_pctPaidSome=0.0182356648+(pctPaidSome-0.619553449)*-0.069184334;
else if pctPaidSome<=0.7692307692 then
y_pctPaidSome=0.0123790796+(pctPaidSome-0.7042053466)*0.021119598;
else if pctPaidSome<=0.839232784 then
y_pctPaidSome=0.0137523904+(pctPaidSome-0.7692307692)*-0.09186517;
else if pctPaidSome<=0.9707636314 then
y_pctPaidSome=0.0073216435+(pctPaidSome-0.839232784)*-0.003421285;
else y_pctPaidSome=0.0068716389;
```

Based on the model development data, the average payment rate (average Y) for the treatment group was 0.62784, while the average payment rate for the control group was 0.61951. The overall payment rate difference between the treatment group and the control group is only 0.008328. Is this payment rate difference statistically significantly from 0? To answer this question, an asymptotic Z-test can be performed to compare the average pay rates between the treatment group and the control group. The payment rate for the combined test and control data is (310358*0.62784+310445*0.61951)/(310358+310445)=0.623675, and the Z-statistic turns out to be:

$$\frac{0.62784 - 0.61951}{\sqrt{\left(\frac{1}{310358} + \frac{1}{310445}\right) \times 0.623675 \times (1 - 0.623675)}} = 6.77 > 1.96$$

Thus, the Z-statistic indicates that the payment rate difference between the treatment and the control is statistically significantly different from 0. In addition to that, the development data is large enough. Therefore, the computer-implemented method proceeds to build the incremental payment rate model.

In step 1, the computer-implemented method conducts an initial variable screening step based on the model development data to identify the variables that are "decision relevant" and "time invariant". In this step, only the predictors that have a small p-value (<0.05) for the corresponding 2-term interaction and have a large p-value (>0.3) for the corresponding 3-term interaction are selected as model variables. Fifty variables are selected, with all of them happening to be continuous.

In step 2, the fifty variables are ranked based on their p-values for the corresponding 2-term interactions, from low to high.

In step 3, for each of the fifty variables, the computer-implemented method develops a piecewise linear function to describe the relationship between the incremental effect and the variable based on binning.

For example, the top ranked variable "pctPaidSome" has the lowest p-value for the corresponding 2-term interaction. Proc rank in SAS™ is used to create the bins for the observations based on their values of the variable pctPaidSome.

In step 4, for each of the piecewise linear functions corresponding to the model variables that are initially selected, the computer-implemented method searches for the optimal weight from eleven values: 0, 0.15, 0.3, 0.45, 0.6, 0.75, 0.9, 1.05, 1.2, 1.35, and 1.5.

At the beginning of the weight search, the weight for the variable y_pctPaidSome, the piecewise linear function of the first ranked variable pctPaidSome, is set as 1. Therefore, the initial score $S_1$=y_pctPaidSome*1. The incremental effect area index is 0.1961.

Next, y_d2_Cur2Max_PctRevlv, the piecewise linear function of the second variable _d2_Cur2Max_PctRevlv, is considered. The computer-implemented method creates a candidate score for each of the eleven weight values in [0, 1.5], which is the existing score S1 added by the product of the weight and the piecewise linear function y_d2_Cur2Max_PctRevlv. Then for each candidate score, the incremental effect area index is calculated. The result is shown in Table 1.

TABLE 1

| Weight | Incremental Effect Area Index |
|---|---|
| 0 | 0.1961 |
| 0.15 | 0.1754 |
| 0.30 | 0.1872 |
| 0.45 | 0.1732 |
| 0.60 | 0.1617 |
| 0.75 | 0.1624 |
| 0.90 | 0.1602 |
| 1.05 | 0.1500 |
| 1.20 | 0.1500 |
| 1.35 | 0.1636 |
| 1.50 | 0.1500 |

Based on Table 1, the incremental effect area index reaches its maximum 0.1961 when the candidate score has a weight equal to 0. Thus, the piecewise linear function y_d2_Cur2Max_PctRevlv corresponding to the second variable does not need to be included in the incremental effect model. The score $S_2$ stays unchanged, $S_2$=y_pctPaidSome*1. The incremental effect area index is still 0.1961.

Next, y_DLQ_30DAY_CT, the piecewise linear function of the third variable DLQ_30DAY_CT, is considered. For each of the eleven weight values in [0, 1.5], a candidate score that is the existing score $S_2$ plus the product of the weight and y_DLQ_30DAY_CT is created. Then for each candidate score, the incremental effect area index is calculated. The results are shown in Table 2.

TABLE 2

| Weight | Incremental Effect Area Index |
|---|---|
| 0 | 0.1961 |
| 0.15 | 0.2074 |
| 0.30 | 0.2214 |
| 0.45 | 0.2185 |
| 0.60 | 0.2054 |
| 0.75 | 0.1952 |
| 0.90 | 0.2221 |
| 1.05 | 0.2242 |
| 1.20 | 0.2282 |
| 1.35 | 0.2373 |
| 1.50 | 0.2422 |

Based on Table 2, the incremental effect area index reaches its maximum 0.2422 when the weight equals 1.5. Thus the score $S_3$ is update to $S_3$=y_pctPaidSome*1+y_DLQ_30DAY_CT*1.5. The incremental effect area index is now 0.2422.

The computer-implemented method keeps going through the similar weight search process until all fifty variables have been considered. The final model score is a weighted sum of eleven selected piecewise linear functions. The other thirty-nine variables had an optimum weight of zero and thus were excluded from the model. The score equation is $$score = y\_pctPaidSome * 1 + y\_DLQ\_30DAY\_CT * 1.5 + y\_xvar3 * 1.35 +$$
$$y\_xvar4 * 1.35 + y\_xvar5 * 0.3 + y\_xvar6 * 1.35 + y\_xvar7 * 0.9 +$$
$$y\_xvar8 * 0.45 + y\_xvar9 * 1.2 + y\_xvar10 * 0.15 + y\_xvar11 * 0.45$$

The final score is evaluated based on the performance of the score in both development data and out of time data. Table 3 shows the model performance on the development data.

Based on the score, all of the observations in the development data are ranked from low to high and are then divided into ten deciles (10 groups, or 10 ranks) with each decile having an equal number of observations. Decile 1 has 10% of the observations with the lowest score values. Decile 2 has 10% of the observations with second lowest score values. And so on. Decile 10 has 10% of the observations with the highest score values. Column 2 shows the number of observations in the test group for each decile. Column 3 shows the number of observations in the control group for each decile. Column 4 has the average payment rate of the accounts in the test group for each decile. Column 5 has the average payment rate of the accounts in the control group for each decile. Column 6 is the difference between column 4 and column 5, which is equal to the average incremental payment rate for each decile. As can be seen from this column, decile 1 has the lowest incremental payment rate, a negative number −0.0034, and decile 10 has the highest incremental payment rate of 0.0229. When the model decile gets closer to the bottom, the actual incremental payment rate tends to get higher. This means that when the model score gets higher, the actual incremental payment rate tends to be higher. This implies that the model score rank orders the incremental effect well. The last column of Table 3 is the cumulative incremental payment rate. It actually shows the values of the cumulative effect function of treatment when the percentages of observations are 10%, 20%, . . . , and 100%. Based on this column, if 20% of the accounts with the lowest incremental effect model scores (i.e., the accounts in decile 1 and decile 2) are selected, the cumulative incremental payment rate of these accounts is −0.0005. Hence in direct mail campaigns, a strategy that leaves out these 20% of accounts would save 20% of the mailing cost and it would not hurt the payment rate in collection.

Table 4 shows the model score performance for the out-of-time validation data. Clearly, the model still performs well in terms of rank ordering the incremental effect.

TABLE 3

| Decile | No. of Acct in Test | No. of Acct in Ctrl | Avg. Pay Rate in Test | Avg. Pay Rate in Ctrl | Incremental Pay Rate | Cum. Incremental Pay Rate |
|---|---|---|---|---|---|---|
| 1 | 31,132 | 30,948 | 0.6400 | 0.6434 | −0.0034 | −0.0034 |
| 2 | 30,970 | 31,060 | 0.6321 | 0.6296 | 0.0024 | −0.0005 |
| 3 | 31,833 | 32,092 | 0.6213 | 0.6123 | 0.0091 | 0.0028 |
| 4 | 30,351 | 29,933 | 0.6442 | 0.6434 | 0.0008 | 0.0024 |
| 5 | 30,868 | 31,209 | 0.6483 | 0.6423 | 0.0060 | 0.0031 |
| 6 | 30,975 | 31,105 | 0.6553 | 0.6454 | 0.0098 | 0.0042 |
| 7 | 31,059 | 31,022 | 0.6410 | 0.6337 | 0.0073 | 0.0046 |
| 8 | 31,188 | 30,898 | 0.6299 | 0.6181 | 0.0118 | 0.0055 |
| 9 | 31,040 | 31,039 | 0.6139 | 0.5982 | 0.0157 | 0.0066 |
| 10 | 30,942 | 31,139 | 0.5529 | 0.5300 | 0.0229 | 0.0083 |
| Overall | 310,358 | 310,445 | 0.6278 | 0.6195 | 0.0083 | |

TABLE 4

| Decile | No. of Acct in Test | No. of Acct in Ctrl | Avg. Pay Rate in Test | Avg. Pay Rate in Ctrl | Incremental Pay Rate | Cum. Incremental Pay Rate |
|---|---|---|---|---|---|---|
| 1 | 14,078 | 14,073 | 0.6585 | 0.6606 | −0.0021 | −0.0021 |
| 2 | 14,044 | 14,107 | 0.6568 | 0.6507 | 0.0061 | 0.0020 |
| 3 | 14,115 | 14,039 | 0.6346 | 0.6333 | 0.0014 | 0.0018 |
| 4 | 14,088 | 14,064 | 0.6640 | 0.6559 | 0.0081 | 0.0033 |
| 5 | 14,111 | 14,053 | 0.6632 | 0.6543 | 0.0089 | 0.0045 |
| 6 | 14,084 | 14,093 | 0.6613 | 0.6492 | 0.0121 | 0.0057 |

TABLE 4-continued

| Decile | No. of Acct in Test | No. of Acct in Ctrl | Avg. Pay Rate in Test | Avg. Pay Rate in Ctrl | Incremental Pay Rate | Cum. Incremental Pay Rate |
|---|---|---|---|---|---|---|
| 7 | 14,129 | 13,955 | 0.6494 | 0.6359 | 0.0135 | 0.0068 |
| 8 | 13,924 | 14,260 | 0.6349 | 0.6225 | 0.0124 | 0.0076 |
| 9 | 14,010 | 14,143 | 0.6173 | 0.5998 | 0.0175 | 0.0087 |
| 10 | 14,085 | 14,064 | 0.5499 | 0.5289 | 0.0210 | 0.0099 |
| Overall | 140,668 | 140,851 | 0.6390 | 0.6291 | 0.0099 | |

For comparison purpose, a traditional benchmark score is included, which is basically a payment likelihood score in a business as usual environment. This benchmark score is being used in some loss prevention strategies. The performance of this benchmark score in rank ordering incremental payment rate is shown on Table 5 for model development data, and on Table 6 for out of time validation data.

TABLE 5

Benchmark—Development Data

| Decile | No. of Acct in Test | No. of Acct in Ctrl | Avg. Pay Rate in Test | Avg. Pay Rate in Ctrl | Incremental Pay Rate | Cum. Incremental Pay Rate |
|---|---|---|---|---|---|---|
| 1 | 30,965 | 31,115 | 0.4115 | 0.4053 | 0.0061 | 0.0061 |
| 2 | 31,198 | 30,882 | 0.5313 | 0.5317 | −0.0004 | 0.0033 |
| 3 | 30,971 | 31,110 | 0.5906 | 0.5806 | 0.0100 | 0.0054 |
| 4 | 30,970 | 31,110 | 0.6185 | 0.6138 | 0.0047 | 0.0051 |
| 5 | 31,094 | 30,987 | 0.6443 | 0.6343 | 0.0100 | 0.0062 |
| 6 | 31,126 | 30,954 | 0.6664 | 0.6586 | 0.0078 | 0.0065 |
| 7 | 30,983 | 31,097 | 0.6779 | 0.6695 | 0.0083 | 0.0067 |
| 8 | 31,069 | 31,012 | 0.6891 | 0.6786 | 0.0105 | 0.0072 |
| 9 | 30,936 | 31,144 | 0.7146 | 0.7013 | 0.0133 | 0.0078 |
| 10 | 31,046 | 31,034 | 0.7343 | 0.7214 | 0.0129 | 0.0083 |
| Overall | 310,358 | 310,445 | 0.6278 | 0.6195 | 0.0083 | |

TABLE 6

Benchmark—Out-of-Time Validation

| Decile | No. of Acct in Test | No. of Acct in Ctrl | Avg. Pay Rate in test | Avg. Pay Rate in Ctrl | Incremental Pay Rate | Cum. Incremental Pay Rate |
|---|---|---|---|---|---|---|
| 1 | 14,100 | 14,052 | 0.4388 | 0.4350 | 0.0039 | 0.0039 |
| 2 | 14,021 | 14,131 | 0.5633 | 0.5529 | 0.0104 | 0.0068 |
| 3 | 14,084 | 14,068 | 0.6041 | 0.5961 | 0.0080 | 0.0073 |
| 4 | 14,185 | 13,967 | 0.6320 | 0.6249 | 0.0071 | 0.0075 |
| 5 | 14,125 | 14,027 | 0.6529 | 0.6415 | 0.0114 | 0.0084 |
| 6 | 13,950 | 14,202 | 0.6721 | 0.6658 | 0.0062 | 0.0077 |
| 7 | 14,119 | 14,033 | 0.6831 | 0.6694 | 0.0137 | 0.0086 |
| 8 | 14,145 | 14,007 | 0.6967 | 0.6822 | 0.0146 | 0.0095 |
| 9 | 13,895 | 14,257 | 0.7144 | 0.7001 | 0.0144 | 0.0098 |
| 10 | 14,044 | 14,107 | 0.7338 | 0.7219 | 0.0118 | 0.0099 |
| Overall | 140,668 | 140,851 | 0.6390 | 0.6291 | 0.0099 | |

In Table 5 and Table 6, the incremental payment rate (shown in column 6) does not have an evident trend across the deciles. Thus, the benchmark score does not rank order the incremental payment rate very well.

To have a better comparison of the two scores, the cumulative incremental effect function curve for the incremental pay rate model score and that for the benchmark score are overlaid on the same figure based on the development data (shown on FIG. 8). A similar figure is created based on the out of time data (shown on FIG. 9). In both figures, the cumulative incremental effect function of the incremental payment rate model is consistently below that of the benchmark score. The incremental effect model has an area index of 0.666 for development data and an area index of 0.574 for the out of time data; while the benchmark score has an area index of 0.260 for development data and an area index of 0.232 for the out of time data. The area indexes of the benchmark score are much smaller than those of the incremental payment rate model. Hence, the incremental payment rate model outperforms the benchmark score.

The computer-implemented methods, computer program products, and apparatuses described herein provide a technical effect to solve a technical problem. At a minimum, the computer-implemented methods, computer program products, and apparatuses described herein reduce the wasted resources expended by financial systems by more accurately identifying individuals that will be influenced by a treatment.

It is understood that the servers, systems, and devices described herein illustrate one embodiment of the invention. It is further understood that one or more of the servers, systems, and devices can be combined in other embodiments and still function in the same or similar way as the embodiments described herein.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. An incremental effect modeling apparatus comprising:
a computing device processor;
a storage device; and
an incremental effect modeling application stored in said storage device and configured for operation on said computing device processor, said application configured to:
determine a set of model variables from a plurality of predictor variables that are decision relevant and optionally time invariant, wherein the predictor variables are associated with a response variable or a performance variable and a decision variable for a population, wherein the decision variable defines treated observations and control observations in the population;

determine a function describing a relationship between an incremental effect and the model variable, wherein the incremental effect is defined as the difference between performance of an individual under treatment and the performance of the individual under no treatment;

rank order the treated and control observations in the population based on a score from low to high, wherein the score is a weighted sum of a set of functions created from the model variables;

determine a cumulative incremental effect at increasing percentages of ranked observations with the lowest score values, based on the combined test and control data;

determine an incremental effect area index based on the cumulative incremental effect as a function of the increasing percentages of ranked observations with the lowest score values; and iterate through the functions of the model variables for weight searching until the incremental effect area index is maximized to determine the incremental effect model.

2. The incremental effect modeling apparatus of claim 1, the apparatus further comprising a communications module configured to communicate with a database.

3. The incremental effect modeling apparatus of claim 2, wherein the database comprises the plurality of predictor variables, response variables, and decision variables.

4. The incremental effect modeling apparatus of claim 1, the apparatus further comprising a network adapter configured to communicate with at least one of a user, a financial institution, and a marketing database.

5. The incremental effect modeling apparatus of claim 1, the apparatus further comprising a marketing module, wherein the marketing module is configured to treat individuals based on the incremental effect model determined by the incremental effect modeling application.

6. The incremental effect modeling apparatus of claim 5, wherein the marketing module automatically contacts the individuals.

7. The incremental effect modeling apparatus of claim 1, wherein the application is further configured to rank order the model variables based on a statistical test of the significance of the two-term interaction between the model variable and the decision variable according to a linear model, wherein the model variable and the decision variable are treated as class variables, and the response variable is regressed on the model variable, the decision variable, and the interaction between the model variable and the decision variable.

8. The incremental effect modeling apparatus of claim 1, wherein the application further comprises an area index maximization module configured to analyze multiple model scores comprising weighted sum of nonlinear functions and select the score wherein the incremental effect area index is maximized.

9. The incremental effect modeling apparatus of claim 1, wherein predictor variables are excluded if a three-term interaction of the decision variable, the predictor variable, and a time variable has a p-value lower than a predetermined p-value, wherein the three-term interaction is determined based on a linear model which treats the decision variable, the predictor variable, and the time variable as class variables and uses them and their interactions to regress the response variable.

10. A computer program product for determining an incremental effect model, the computer program product comprising:

a non-transitory computer-readable medium comprising:

an executable portion for causing a computer to determine at least one model variable from a plurality of predictor variables, wherein the model variable is associated with a response variable or a performance variable and a decision variable for a population, wherein the decision variable defines treated observations and control observations in the population;

an executable portion for causing a computer to determine a difference in the response variable between the treated observations and the control observations;

an executable portion for causing a computer to determine a function describing the relationship between the difference and the model variable;

an executable portion for causing a computer to rank order the treated and control observations in the population based on a score, which is a weighted sum of functions of some model variables;

an executable portion for causing a computer to determine a cumulative incremental effect between the response value for the treated and control observations at increasing percentages of ranked observations with the lowest score values;

an executable portion for causing a computer to determine an incremental effect area index based on the cumulative incremental effect as a function of the increasing percentages of ranked observations with the lowest score values; and an executable portion for causing a computer to iterate through the functions of the model variables until the incremental effect area index is maximized to determine the incremental effect model.

11. The computer program product according to claim 10, wherein the non-transitory computer-readable medium further comprises an executable portion for causing a computer to rank order the model variables.

12. The computer program product according to claim 11, wherein the model variables are rank ordered by a p-value associated with a two-term interaction between the model variable and the decision variable.

13. The computer program product according to claim 10, wherein the non-transitory computer-readable medium further comprises an executable portion for causing a computer to weight the function to define a score, wherein the score is used to rank order the observations.

14. The computer program product according to claim 13, wherein the non-transitory computer-readable medium further comprises an executable portion for causing a computer to create the score by adding the existing score with a product of the weight and the nonlinear function or transformation of the next model variable.

15. The computer-program product according to claim 10, wherein the function describing the relationship between the incremental effect and the model variable, wherein the function is a piecewise linear function when the model variable is a continuous variable.

16. The computer-program product according to claim 10, wherein the non-transitory computer-readable medium further comprises an executable portion to convert continuous predictor variables to categorical predictor variables based on binning.

17. The computer-program product according to claim 10, wherein the difference in the response variable between the treated observations and the control observations is a difference between an average value for the response variable for the treated observations and an average value for the response variable for the control observations within bins which categorize the population based on the values of a model variable.

18. A computer-implemented method of determining an incremental effect model, the method comprising:
   determine a set of model variables from a plurality of predictor variables that are decision relevant and optionally time invariant, wherein the predictor variables are associated with a response variable or a performance variable and a decision variable for a population, wherein the decision variable defines treated observations and control observations in the population;
   determine a function describing the relationship between an incremental effect and the model variable, wherein the incremental effect is defined as the difference between performance of an individual under treatment and the performance of the individual under no treatment;
   rank order the treated and control observations in the population based on a score from low to high, wherein the score is a weighted sum of a set of functions created from the model variables;
   determine a cumulative incremental effect at increasing percentages of ranked observations with the lowest score values, based on the combined test and control data;
   determine an incremental effect area index based on the cumulative incremental effect as a function of the increasing percentages of ranked observations with the lowest score values; and
   iterate through the functions of the model variables for weight search until the incremental effect area index is maximized to determine an incremental effect model;
   rank ordering the model variables based on a significance value for a two-term interaction between the decision variable and a predictor variable;
   determining a function describing the relationship between the incremental effect and the model variable.

19. The computer-implemented method of claim 18, further comprising determining which individuals to treat based on the incremental effect model.

20. The computer-implemented method of claim 19, wherein the individuals are selected for treatment based on a higher positive response rate predicted by the incremental effect model.

* * * * *

UNITED STATES PATENT AND TRADEMARK OFFICE
CERTIFICATE OF CORRECTION

PATENT NO. : 8,818,920 B2  
APPLICATION NO. : 13/416149  
DATED : August 26, 2014  
INVENTOR(S) : Liu et al.

Page 1 of 1

It is certified that error appears in the above-identified patent and that said Letters Patent is hereby corrected as shown below:

In the Specification

Replace column 6, lines 40-45, with the following:

$$Incremental\ Effect\ Area\ Index \approx 1 - \frac{1}{C(1)}\left\{\frac{p_1 + p_2}{2}C(p_1) + \sum_{i=2}^{s-1}\frac{p_{i+1} - p_{i-1}}{2}C(p_i) + \frac{p_s - p_{s-1}}{2}C(p_s)\right\}$$

Replace column 16, lines 16-20, with the following:

$$Incremental\ Effect\ Area\ Index \approx 1 - \frac{1}{C(1)}\left\{\frac{p_1 + p_2}{2}C(p_1) + \sum_{i=2}^{s-1}\frac{p_{i+1} - p_{i-1}}{2}C(p_i) + \frac{p_s - p_{s-1}}{2}C(p_s)\right\}$$

Replace column 20, lines 14-19, with the following:

$$Incremental\ Effect\ Area\ Index \approx 1 - \frac{1}{C(1)}\left\{\frac{p_1 + p_2}{2}C(p_1) + \sum_{i=2}^{s-1}\frac{p_{i+1} - p_{i-1}}{2}C(p_i) + \frac{p_s - p_{s-1}}{2}C(p_s)\right\}$$

Signed and Sealed this  
Twenty-third Day of December, 2014

Michelle K. Lee  
*Deputy Director of the United States Patent and Trademark Office*